United States Patent
Yamagishi

(10) Patent No.: US 10,178,417 B2
(45) Date of Patent: Jan. 8, 2019

(54) COMMUNICATION APPARATUS, COMMUNICATION DATA GENERATION METHOD, AND COMMUNICATION DATA PROCESSING METHOD

(71) Applicant: Saturn Licensing LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/110,197

(22) PCT Filed: Dec. 1, 2014

(86) PCT No.: PCT/JP2014/081715
§ 371 (c)(1),
(2) Date: Jul. 7, 2016

(87) PCT Pub. No.: WO2015/107786
PCT Pub. Date: Jul. 23, 2015

(65) Prior Publication Data
US 2016/0330491 A1 Nov. 10, 2016

(30) Foreign Application Priority Data
Jan. 17, 2014 (JP) ................................ 2014-006881

(51) Int. Cl.
*H04N 21/235* (2011.01)
*H04N 21/236* (2011.01)
(Continued)

(52) U.S. Cl.
CPC ......... *H04N 21/236* (2013.01); *H04N 21/238* (2013.01); *H04N 21/6437* (2013.01); *H04N 21/64322* (2013.01); *H04N 21/845* (2013.01); *H04N 21/8456* (2013.01); *H04N 21/85406* (2013.01)

(58) Field of Classification Search
CPC combination set(s) only.
See application file for complete search history.

(56) References Cited

U.S. PATENT DOCUMENTS

2010/0260484 A1* 10/2010 Hattori ................ H04N 5/85
386/355
2013/0091251 A1   4/2013 Walker et al.
(Continued)

FOREIGN PATENT DOCUMENTS

JP 2009-519619 A 5/2009
JP 2011-087103 A 4/2011
(Continued)

OTHER PUBLICATIONS

Extended European Search Report dated Jun. 7, 2017 in Patent Application No. 14878795.5.
(Continued)

*Primary Examiner* — Kieu Oanh T Bui
(74) *Attorney, Agent, or Firm* — Oblon, McClelland, Maier & Neustadt, L.L.P.

(57) ABSTRACT

A configuration in which it can be determined on a packet-by-packet basis whether encoded data stored in communication packets is data based on randomly accessible encoded data is provided. A transmission apparatus generates a packet storing a NAL unit which is a component of encoded data or a packet storing NAL unit fragments obtained by further dividing the NAL unit, sets access point information indicating whether the NAL unit serving as the source data of packet storage data includes data serving as a random access point as additional information, and transmits the packet. A reception apparatus determines whether packet storage data is data generated based on randomly accessible encoded data with reference to the additional information of the packet.

17 Claims, 28 Drawing Sheets

(51) Int. Cl.
*H04N 21/643* (2011.01)
*H04N 21/845* (2011.01)
*H04N 21/854* (2011.01)
*H04N 21/238* (2011.01)
*H04N 21/6437* (2011.01)

(56) References Cited

U.S. PATENT DOCUMENTS

2016/0261893 A1* 9/2016 Oh .................. H04N 21/238
2016/0295257 A1* 10/2016 Iguchi .................. H04N 5/38

FOREIGN PATENT DOCUMENTS

WO 2011/038013 A 3/2011
WO 2013/077670 A 5/2013

OTHER PUBLICATIONS

Office Action dated Apr. 25, 2018 in corresponding European Patent Application No. 14 878 795.5, 18 pages.
Thomas Schierl et al., "System Layer Integration of High Efficiency Video Coding", IEEE Transactions on Circuits and Systems for Video Technology, vol. 22, No. 12, XP11487157, Dec. 2012, pp. 1871-1884.
Thomas Rathgen et al., "ISO/MP4 File Format for Storage of Scalable Video", ISO/IEC JTC1/SC29/WG11, MPEG2005/M12043, XP2385303, Apr. 2005, pp. 1-27.
Wang, et al., "draft-ietf:payload-rtp-h265-01—RTP Payload Format for High Efficiency Video Coding (HEVC)", XP55308701, Sep. 6, 2013, pp. 1-76, Retrieved from the Internet: URL:https://tools.ietf.org/html/draft-ietf-payload-rtp-h265-01 [retrieved on Oct. 7, 2016].

* cited by examiner

FIG. 6

(a) SUB GOP MEDIA SEGMENT STORAGE HTTP PACKET CONFIGURATION EXAMPLE 1

| HTTP header | 'msdh' (styp) | sidx | moof | mdat NAL ... NAL |

(b) SUB GOP MEDIA SEGMENT STORAGE HTTP PACKET CONFIGURATION EXAMPLE 2

| HTTP header | 'msdh' (styp) | moof | mdat NAL ... NAL |

FIG. 10

(1) INITIALIZATION SEGMENT STORAGE IP PACKET

| IP header | UDP header | LCT header | HTTP header | 'dash' (ftyp) | moov |
|---|---|---|---|---|---|

(2) SUB GOP MEDIA SEGMENT STORAGE IP PACKET

| IP header | UDP header | LCT header | HTTP header | 'msdh' (styp) | sidx | moof | mdat (NAL, NAL) |
|---|---|---|---|---|---|---|---|

FIG. 22

| | FIELD | SIZE (bit) | SET VALUE |
|---|---|---|---|
| (a) | SEGMENT IDENTIFICATION INFORMATION (Initialization_Segment_Identifier) | 8 | INITIALIZATION SEGMENT = 1, OTHER SEGMENTS = 0 |
| (b) | IN-GOP POSITION IDENTIFICATION INFORMATION (SubGOP Indicator) | 8 | HEAD POSITION (StartofGOP) OF GOP = 1 INTERMEDIATE POSITION (MiddleofGOP) OF GOP = 2 TAIL POSITION (EndOfGOP) OF GOP = 3 |
| (c) | MOVIE FRAGMENT SEQUENCE NUMBER (MovieFragmentSequenceNumber) | 32 | STORE FRAGMENT SEQUENCE NUMBER OF METADATA (moof) SETTING OF SUB GOP MEDIA SEGMENT BEFORE DIVIDED INTO NAL UNIT FRAGMENTS |
| (d) | NAL UNIT FRAGMENT HEADER (NALUFragmentSubSegmentHeader) | 8 | METADATA STORAGE TYPE NAL UNIT FRAGMENT CORRESPONDENCE PACKET = 1, OTHER PACKETS = 0 |
| (e) | IN-NAL UNIT POSITION IDENTIFICATION INFORMATION (NALUFragmentIndicator) | 8 | HEAD POSITION OF NAL UNIT BEFORE DIVISION (StartNALUnitFragmentSubSegment) = 1 INTERMEDIATE POSITION OF NAL UNIT BEFORE DIVISION (MiddleNALUnitFragmentSubSegment) = 2 TAIL POSITION OF NAL UNIT BEFORE DIVISION (EndNALUnitFragmentSubSegment) = 3 |
| (f) | ACCESS POINT INFORMATION (SAPIndicator) | 8 | PACKET GENERATED FROM NAL UNIT STORAGE SEGMENT INCLUDING ACCESS POINT = 1, OTHER PACKETS = 0 |

FIG. 23

(1) INITIALIZATION SEGMENT HTTP PACKET

| HTTP header | EXTENSION HEADER | | | | 'dash' (ftyp) | moov |
|---|---|---|---|---|---|---|
| | 1 | 0 | 0 | 0, 1 | | |
| (a) | (b) | (c) | (d) | (e) | (f) | |

(2) MEDIA SEGMENT BASED METADATA STORAGE TYPE NAL UNIT FRAGMENT CORRESPONDENCE HTTP PACKET

| HTTP header | EXTENSION HEADER | | | | 'msdh' (styp) | sidx | moof |
|---|---|---|---|---|---|---|---|
| | 0 | 1 TO 3 | 2345 | 1 | 0 | 0, 1 | |
| (a) | (b) | (c) | (d) | (e) | (f) | | |

(3) MEDIA SEGMENT BASED MEDIA DATA STORAGE TYPE NAL UNIT FRAGMENT CORRESPONDENCE HTTP PACKET

| HTTP header | EXTENSION HEADER | | | | mdat | NALf |
|---|---|---|---|---|---|---|
| | 0 | 1 TO 3 | 2345 | 0 | 1 TO 3 | 0, 1 |
| (a) | (b) | (c) | (d) | (e) | (f) | |

FIG. 24

| V | C | PSI | S | O | H | Res | A | B | HDR_LEN | Codepoint(CP) |

CCI(Congestion Control Information)(length=32*(C+q)bits)

TSI(Transport Session Identifier)(length=32*S+16*H bits)

TOI(Transport Object Identifier)(length=32*O+16*H bits)

Header Extensions (if applicable)

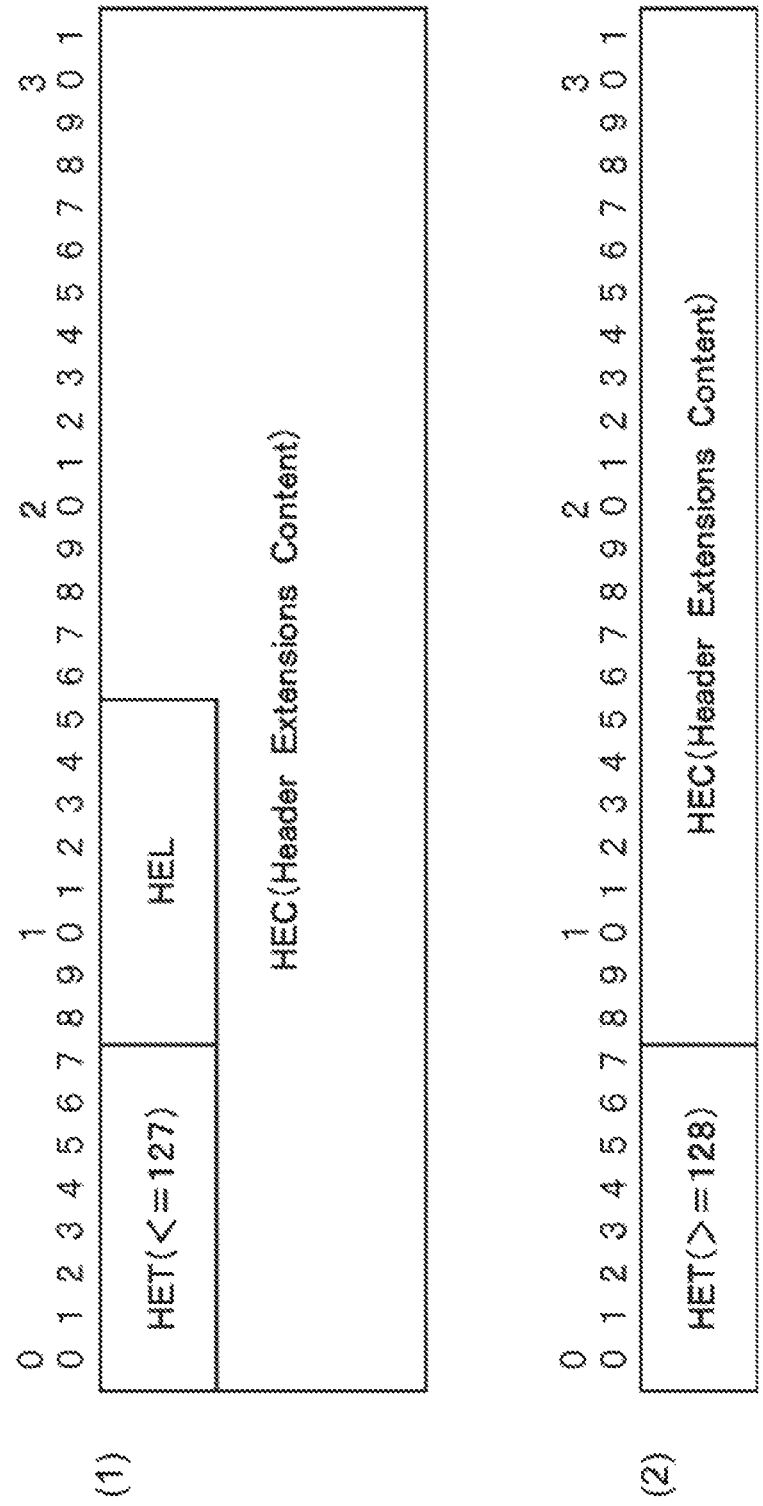

FIG. 26

| | FIELD | SIZE (bit) | SET VALUE |
|---|---|---|---|
| (a) | EXTENSION HEADER IDENTIFICATION INFORMATION (HET) | 8 | 200 (HEADER TYPE) |
| (b) | SEGMENT IDENTIFICATION INFORMATION (Initialization_Segment_Identifier) | 8 | INITIALIZATION SEGMENT = 1, OTHER SEGMENTS = 0 |
| (c) | IN-GOP POSITION IDENTIFICATION INFORMATION (SubGOP Indicator) | 8 | HEAD POSITION (StartOfGOP) OF GOP = 1 INTERMEDIATE POSITION (MiddleOfGOP) OF GOP = 2 TAIL POSITION (EndOfGOP) OF GOP = 3 |
| (d) | MOVIE FRAGMENT SEQUENCE NUMBER (MovieFragmentSequenceNumber) | 32 | STORE FRAGMENT SEQUENCE NUMBER OF METADATA (moof) SETTING OF SUB GOP MEDIA SEGMENT BEFORE DIVIDED INTO NAL UNIT FRAGMENTS |
| (e) | NAL UNIT FRAGMENT HEADER (NALUFragmentSubSegmentHeader) | 8 | METADATA STORAGE TYPE NAL UNIT FRAGMENT CORRESPONDENCE PACKET = 1, OTHER PACKETS = 0 |
| (f) | IN NAL UNIT POSITION IDENTIFICATION INFORMATION (NALUFragmentIndicator) | 8 | HEAD POSITION OF NAL UNIT BEFORE DIVISION (StartNALUnitFragmentSubSegment) = 1 INTERMEDIATE POSITION OF NAL UNIT BEFORE DIVISION (MiddleNALUnitFragmentSubSegment) = 2 TAIL POSITION OF NAL UNIT BEFORE DIVISION (EndNALUnitFragmentSubSegment) = 3 |
| (g) | ACCESS POINT INFORMATION (SAPIndicator) | 8 | PACKET GENERATED FROM NAL UNIT STORAGE SEGMENT INCLUDING ACCESS POINT = 1, OTHER PACKETS = 0 |

COMMUNICATION APPARATUS, COMMUNICATION DATA GENERATION METHOD, AND COMMUNICATION DATA PROCESSING METHOD

CROSS REFERENCE TO RELATED APPLICATIONS

This application is a U.S. National Phase of International Patent Application No. PCT/JP2014/081715 filed on Dec. 1, 2014, which claims priority benefit of Japanese Patent Application No. JP 2014-006881 filed in the Japan Patent Office on Jan. 17, 2014. Each of the above-referenced applications is hereby incorporated herein by reference in its entirety.

TECHNICAL FIELD

The present disclosure relates to a communication apparatus, a communication data generation method, and a communication data processing method. More particularly, the present disclosure relates to a communication apparatus, a communication data generation method, and a communication data processing method, which are capable of performing transmission or reception of data, for example, through a broadcast wave or a network.

BACKGROUND ART

An over the top (OTT) is known as a data delivery scheme capable of delivering content such as image data or audio data regardless of a service form of a telecommunications carrier. Delivery content based on the OTT is referred to as "OTT content," and a delivery service of image (video) data using the OTT is referred to as an "OTT video" or an "over the top video (OTT-V)."

For example, a dynamic adaptive streaming over HTTP (DASH) is used as a fundamental technology of data streaming delivery according to the OTT-V. The DASH is a standard of an adaptive streaming technique using a hypertext transfer protocol (HTTP).

In the adaptive streaming, in order to enable various clients to reproduce delivery content, a content delivery server creates and holds segmented files of moving image content of a plurality of bit rates and a manifest file describing attribute information or a URL thereof.

The client acquires the manifest file from the server, selects optimal bit rate content according to a size of a display unit of its own device or an available communication band, and receives and reproduces selected content. It is also possible to dynamically change a bit rate according to a variation in a network band, and at a client side, it is possible to switch and receive optimal content according to circumstances as necessary, and moving image content reproduction in which the occurrence of video interruption is reduced is implemented. The adaptive streaming is disclosed in, for example, Patent Document 1 (Japanese Patent Application Laid-Open No. 2011-87103).

An MPEG-DASH standard is known as a standard specifying a specification for performing streaming delivery of a moving image or audio data encoded by moving picture expert group (MPEG) according to the DASH.

The MPEG-DASH standard includes the following two standards:

(a) a standard related to a manifest file (media presentation description (MPD)) describing metadata serving as management information of a moving image or an audio file; and (b) a standard related to a file format (segment format) for moving image content transmission.

When streaming delivery of MPEG data is performed according to the DASH, a process is performed according to the MPEG-DAH standard.

However, the DASH serving as the standard of the adaptive streaming technique is based on a point-to-point type HTTP streaming technique serving as a one-to-one communication process.

Thus, for example, when the DASH is applied to streaming delivery of content (a program) that is likely to be simultaneously viewed by a plurality of clients such as sports relay, support of content delivery network (CDN) is necessary.

However, there is a cost restriction to constructing the point-to-point HTTP streaming to which the CDN is applied, and it is difficult to implement scalability equal to broadcast delivery. As described above, the DASH uses a streaming protocol based on the HTTP and has a problem in that it is not adequate to content delivery that enables simultaneous viewing by a plurality of clients such as broadcast delivery.

CITATION LIST

Patent Document

Patent Document 1: Japanese Patent Application Laid-Open No. 2011-87103

SUMMARY OF THE INVENTION

Problems to be Solved by the Invention

It is an object of the present disclosure to provide a communication apparatus, a communication data generation method, and a communication data processing method, which are capable of providing content to a plurality of clients simultaneously in content delivery using a streaming protocol based on the HTTP and implementing real-time reproduction with little delay in each client.

Solutions to Problems

A first aspect of the present disclosure is a communication apparatus, including:

a data processing unit that generates a packet storing encoded data; and a communication unit that transmits the packet generated by the data processing unit, wherein the data processing unit generates a packet storing NAL units configuring a group of pictures (GOP) serving as a processing unit of encoded data or NAL unit fragments obtained by further dividing the NAL unit, and the data processing unit generates a packet to which access point information indicating whether the NAL unit stored in the packet or a NAL unit serving as a division source of the NAL unit fragments includes data serving as a random access point is set as additional information for the packet, and transmits the generated packet through the communication unit.

Further, in an embodiment of the communication apparatus of the present disclosure, the access point information is information indicating whether packet storage data is data generated based on a NAL unit that includes encoded data designated by a streaming access point (SAP).

Further, in an embodiment of the communication apparatus of the present disclosure, the data processing unit generates media data including one or more NAL units serving as configuration data of the GOP and a sub GOP media segment storing metadata corresponding to the media data as the packet storage data.

Further, in an embodiment of the communication apparatus of the present disclosure, the data processing unit generates NAL unit fragments obtained by further dividing a NAL unit configuring the GOP to generate a plurality of packets storing the NAL unit fragment and a packet storing metadata corresponding to the NAL unit.

Further, in an embodiment of the communication apparatus of the present disclosure, the data processing unit generates a packet storing divisional data generated by dividing encoded data serving as a transmission target into data equal to or less than a maximum data transfer unit (a maximum transfer unit (MTU)) specified on a communication path.

Further, in an embodiment of the communication apparatus of the present disclosure, the data processing unit generates a HTTP packet and records the additional information in a HTTP header of the generated packet.

Further, in an embodiment of the communication apparatus of the present disclosure, the data processing unit records the additional information in an extension header of the generated packet.

Further, in an embodiment of the communication apparatus of the present disclosure, the data processing unit records the additional information in an LCT header of the generated packet.

Further, in an embodiment of the communication apparatus of the present disclosure, the communication unit performs broadcast delivery or multicast delivery of the packet generated by the data processing unit through a broadcast wave.

A second aspect of the present disclosure is a communication apparatus, including:

a communication unit that receives encoded data storage packets transmitted by a transmission apparatus; and a data processing unit that receives the packets received by the communication unit, and performs a process, wherein each of the encoded data storage packets received by the communication unit is a packet storing NAL units configuring a group of pictures (GOP) serving as a processing unit of encoded data or NAL unit fragments obtained by further dividing the NAL unit and a packet to which access point information indicating whether the NAL unit stored in the packet or a NAL unit serving as a division source of the NAL unit fragments includes data serving as a random access point is set as additional information.

Further, in an embodiment of the communication apparatus of the present disclosure, the data processing unit performs a process of determining whether data stored in the received packets is data generated based on a NAL unit including encoded data designated by streaming access point (SAP) with reference to the access point information serving as the additional information recorded in the received packets.

Further, in an embodiment of the communication apparatus of the present disclosure, the data processing unit selects and acquires data including an access point with reference to the access point information serving as the additional information recorded in the received packets and performs decoding and reproduction processes.

Further, in an embodiment of the communication apparatus of the present disclosure, the communication unit receives a HTTP packet including a HTTP header in which the additional information is recorded, and the data processing unit acquires the additional information from the HTTP header of the received packet.

Further, in an embodiment of the communication apparatus of the present disclosure, the communication unit receives a packet including an extension header in which the additional information is recorded, and the data processing unit acquires the additional information from the extension header of the received packet.

Further, in an embodiment of the communication apparatus of the present disclosure, the communication unit receives a packet including an LCT header in which the additional information is recorded, and the data processing unit acquires the additional information from the LCT header of the received packet.

Further, in an embodiment of the communication apparatus of the present disclosure, the communication unit receives the packets through a broadcast wave.

A third aspect of the present disclosure is a communication data generation method performed in a data transmission apparatus, including:

generating, by a data processing unit, a packet storing NAL units configuring a group of pictures (GOP) serving as a processing unit of encoded data or NAL unit fragments obtained by further dividing the NAL unit;

generating, by the data processing unit, a packet to which access point information indicating whether the NAL unit stored in the packet or a NAL unit serving as a division source of the NAL unit fragments includes data serving as a random access point is set as additional information for the packet, and transmitting the generated packet through a communication unit.

A fourth aspect of the present disclosure is a communication data processing method performed in a data reception apparatus, including:

a step of receiving, by a communication unit, encoded data storage packets transmitted by a transmission apparatus; and a data processing step of receiving, by a data processing unit, the packets received by the communication unit and performing a process, wherein each of the encoded data storage packets received by the communication unit is a packet storing NAL units configuring a group of pictures (GOP) serving as a processing unit of encoded data or NAL unit fragments obtained by further dividing the NAL unit and a packet to which access point information indicating whether the NAL unit stored in the packet or a NAL unit serving as a division source of the NAL unit fragments includes data serving as a random access point is set as additional information, and the data processing step includes a step of receiving a packet to which the access point information received by the communication unit is set and performing a process.

Other objects, features, and advantages of the present disclosure will be apparent by embodiments of the present disclosure to be described later and a detailed description based on the appended drawings. In this specification, a system refers to a logical aggregate configuration of a plurality of apparatuses and is not limited to a configuration in which apparatuses of respective configurations are arranged in the same housing.

Effects of the Invention

According to the configuration of an embodiment of the present disclosure, a configuration in which it can be determined on a packet-by-packet basis whether encoded data stored in communication packets is data based on randomly accessible encoded data is implemented.

Specifically, a transmission apparatus generates a packet storing a NAL unit which is a component of encoded data or a packet storing NAL unit fragments obtained by further dividing the NAL unit, sets access point information indicating whether the NAL unit serving as the source data of packet storage data includes data serving as a random access point as additional information, and transmits the packet. A reception apparatus determines whether packet storage data is data generated based on randomly accessible encoded data with reference to the additional information of the packet.

With this configuration, a configuration in which it can be determined on a packet-by-packet basis whether encoded data stored in communication packets is data based on randomly accessible encoded data is implemented.

The effects described in this specification are merely examples and not necessarily limited, and an additional effect may be included.

BRIEF DESCRIPTION OF DRAWINGS

FIG. 6 is a diagram for describing an exemplary configuration of a HTTP packet in which a HTTP header is set to a sub GOP media segment.

FIG. 10 is a diagram for describing an exemplary configuration of an IP packet.

FIG. 22 is a diagram for describing an example of additional information recorded in an extension header.

FIG. 23 is a diagram for describing an embodiment in which additional information is recorded in an extension header.

FIG. 24 is a diagram for describing an exemplary configuration of an LCT header set according to a FLUTE protocol.

FIG. 25 is a diagram for describing a data record configuration on a header extension portion of an LCT header.

FIG. 26 is a diagram for describing data recorded in a header extension portion of an LCT header.

MODE FOR CARRYING OUT THE INVENTION

Figure 1:
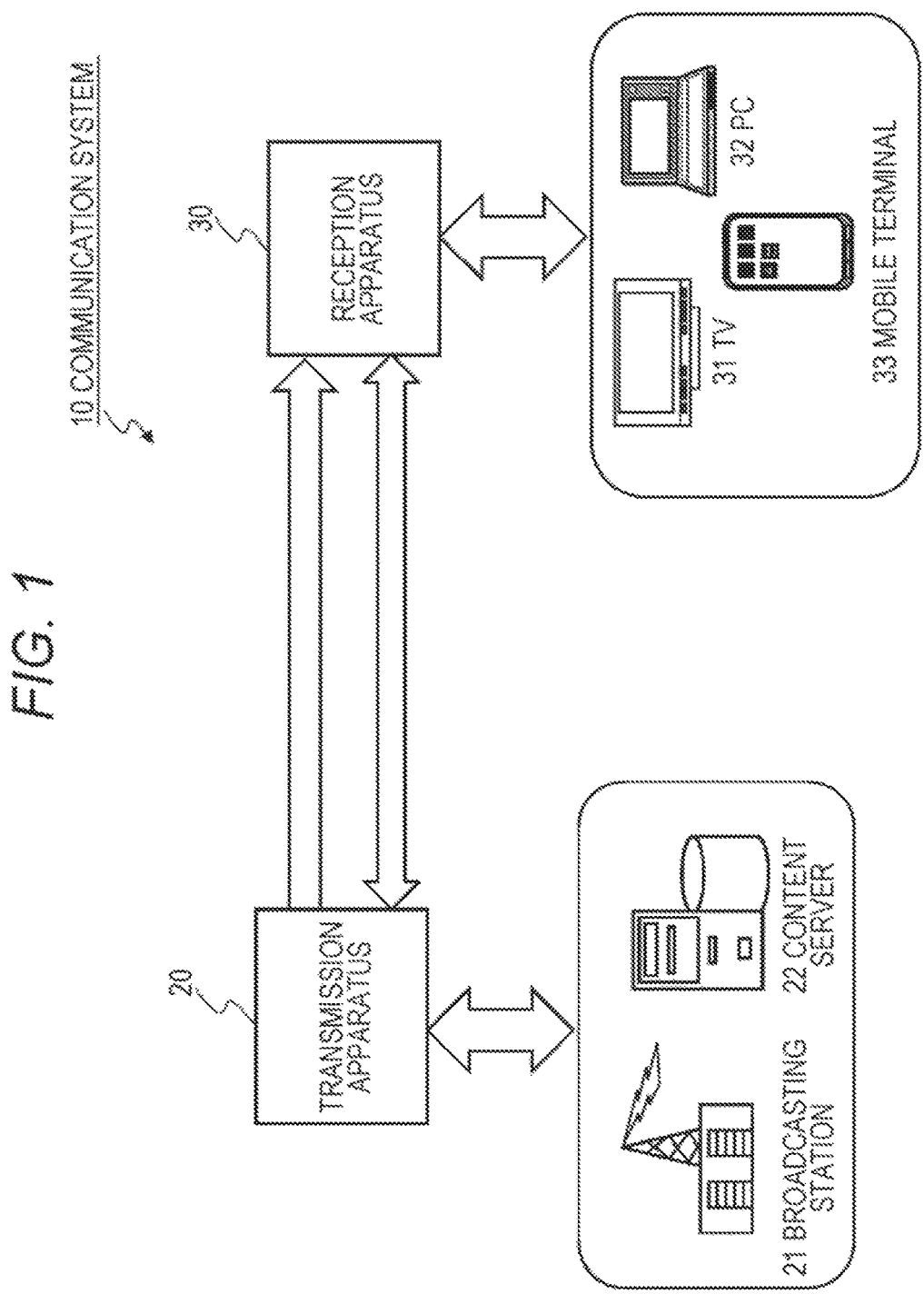
FIG. 1 is a diagram for describing an exemplary configuration of a communication system that executes a process according to the present disclosure.

Hereinafter, a communication apparatus, a communication data generation method, and a communication data processing method according to the present disclosure will be described in detail with reference to the appended drawings. A description will proceed with the following items.
1. Exemplary configuration of communication system
2. Problem in simultaneous delivery type content delivery
3. Segmentation process configuration of transmission data
4. Embodiment in which additional information is recorded in HTTP header
5. Configuration of packet
6. Configurations and processes of transmission apparatus and reception apparatus
7. Configuration in which access point information for identifying whether or not NAL unit stored in packet includes stream access point (SAP) is added
8. Communication processing configuration using NAL unit fragment storage packet obtained by further dividing NAL unit
9. Process sequences of transmission apparatus and reception apparatus
10. Embodiment in which additional information is recorded in extension header
11. Embodiment in which additional information is recorded in LCT header
12. Application example on HEVC encoded data
13. Exemplary hardware configurations of respective apparatuses
14. Conclusion of configuration of present disclosure 1. Exemplary Configuration of Communication System First, an exemplary configuration of a communication system that executes a process according to the present disclosure will be described with reference to FIG. 1.

A communication system 10 includes a transmission apparatus 20 serving as a communication apparatus that transmits content such as image data or audio data and a reception apparatus 30 serving as a communication apparatus that receives transmission content of the transmission apparatus 20 as illustrated in FIG. 1.

Specifically, the transmission apparatus 20 is an apparatus at a content provision side such as a broadcasting station 21 or a content server 22.

Meanwhile, the reception apparatus 30 is a client apparatus of a general user, and is configured with, specifically, for example, a television 31, a PC 32, or a mobile terminal 33.

Data communication between the transmission apparatus 20 and the reception apparatus 30 is performed as two-way communication via a network such as the Internet, one-way communication using a broadcast wave or the like, or communication using both communications.

Content transmission from the transmission apparatus 20 to the reception apparatus 30 is performed according to the MPEG-DASH standard serving as the standard of the adaptive streaming technique.

As described above, the MPEG-DASH standard includes the following two standards:

(a) a standard related to a manifest file (Media Presentation Description (MPD)) describing metadata serving as management information of a moving image or an audio file; and (b) a standard related to a file format (segment format) for moving image content transmission.

Content delivery from the transmission apparatus 20 to the reception apparatus 30 is performed according to the MPEG-DASH standard.

The transmission apparatus 20 encodes content data, and generates a data file including encoded data and metadata of the encoded data. The encoding process is performed, for example, according to an MP4 file format specified in the MPEG. Further, when the transmission apparatus 20 generates a data file of an MP4 format, a file of encoded data is referred to as "mdat," and metadata is referred to as "moov," "moof," or the like.

The encoded data will be described in detail later.

Examples of content provided from the transmission apparatus 20 to the reception apparatus 30 include music data, video data such as a movie, a television program, a video, a photograph, a document, a painting, or a chart, a game, and software.

The transmission data of the transmission apparatus 20 will be described with reference to FIG. 2.

Figure 2:
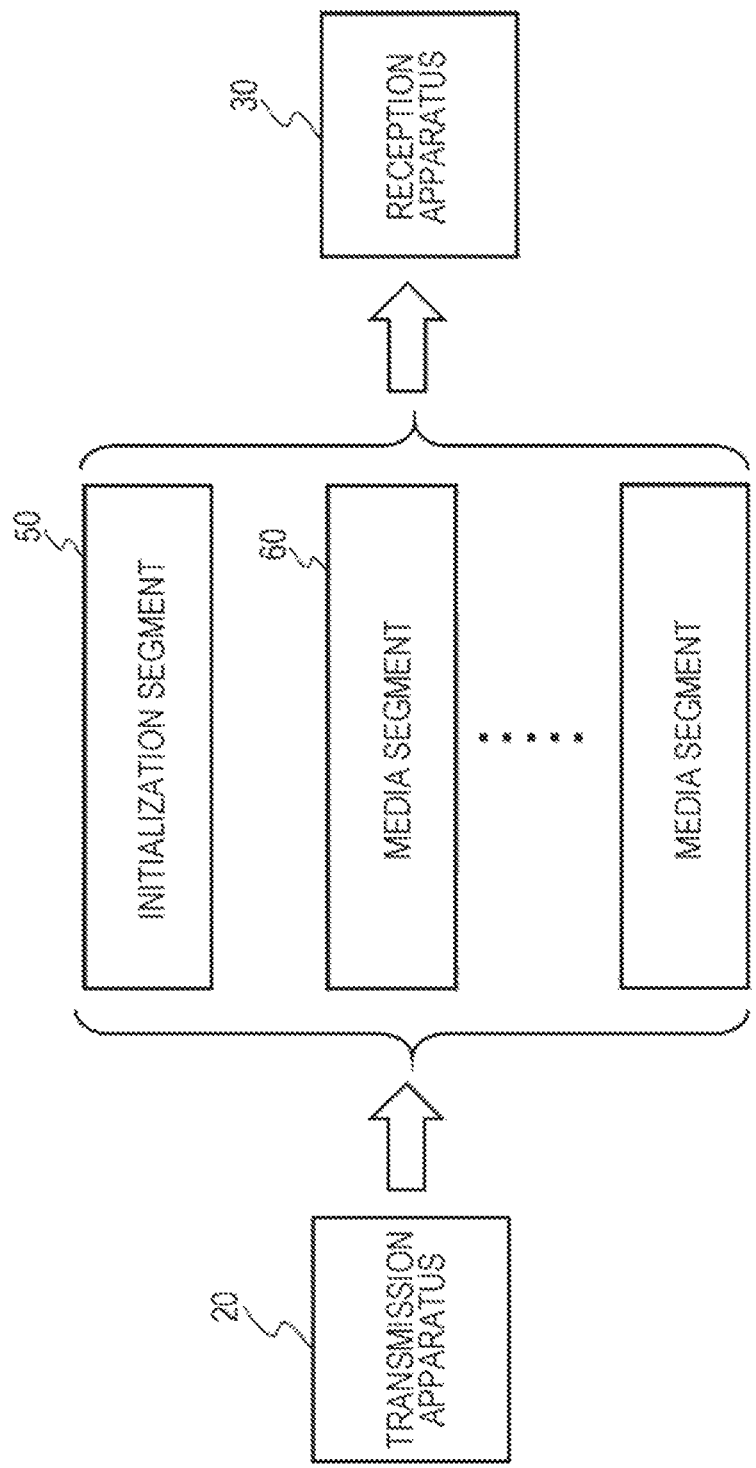
FIG. 2 is a diagram for describing transmission data of a transmission apparatus.

The transmission apparatus 20 that executes the data transmission according to the MPEG-DASH standard stores an initialization segment 50 and a media segment 60 in packets, respectively, and transmits the resulting packets to the reception apparatus 30 as illustrated in FIG. 2. Each of the segments is referred to as a "DASH segment."

Each of the media segments 60 is a segment in which data obtained by dividing MPEG encoded content data is stored.

The initialization segment 50 is a segment in which initial setting information necessary when the reception apparatus 30 side reproduces the storage content of the media segment 60, for example, setting information of a codec or the like is stored.

For example, the transmission apparatus 20 divides content such as one movie or one program, stores divided content in a plurality of media segments 60, and sequentially transmits the plurality of media segments 60.

The transmission apparatus 20 stores the initialization segment 50 and the media segment 60 illustrated in FIG. 2 in HTTP packets, generates IP packets storing the HTTP packet, and transmits the IP packets. A configuration of a transmission packet will be described later in detail.

The reception apparatus 30 illustrated in FIG. 2 first receives one initialization segment 50, and performs, for example, a setting process of a codec according to the setting information stored in the initialization segment. Then, the reception apparatus 30 sequentially receives the media segments 60, decodes the media segments 60 according to a reproduction order, and performs a reproduction process.

2. Problem in Simultaneous Delivery Type Content Delivery

As described above, the DASH serving as the standard of the adaptive streaming technique is based on the point-to-point HTTP streaming, and has a problem in that it is not adequate to simultaneous delivery type content delivery that enables simultaneous viewing by a plurality of clients.

However, by using the multicast and broadcast (MC/BC) together, it is considered that content can be simultaneously provided to a plurality of clients (reception apparatuses) without any delay.

Examples of a transport protocol applicable to multicast/broadcast (MC/BC) type streaming include a real-time transport protocol (RTP) and a file delivery over uni-directional transport (FLUTE).

An exemplary configuration of the DASH segment usable when content stream delivery is performed according to the HTTP streaming-based DASH standard using a FLUTE protocol will be described with reference to FIG. 3.

As described above with reference to FIG. 2, the DASH segments are classified into two types:

(a) the initialization segment; and (b) the media segment.

(a) The initialization segment is a segment in which initialization data such as setting information necessary when content reproduction is performed such as a setting of a decoder in the reception apparatus 30 is stored.

(b) The media segment is a segment in which encoded content serving as a reproduction target is stored.

Figure 3:
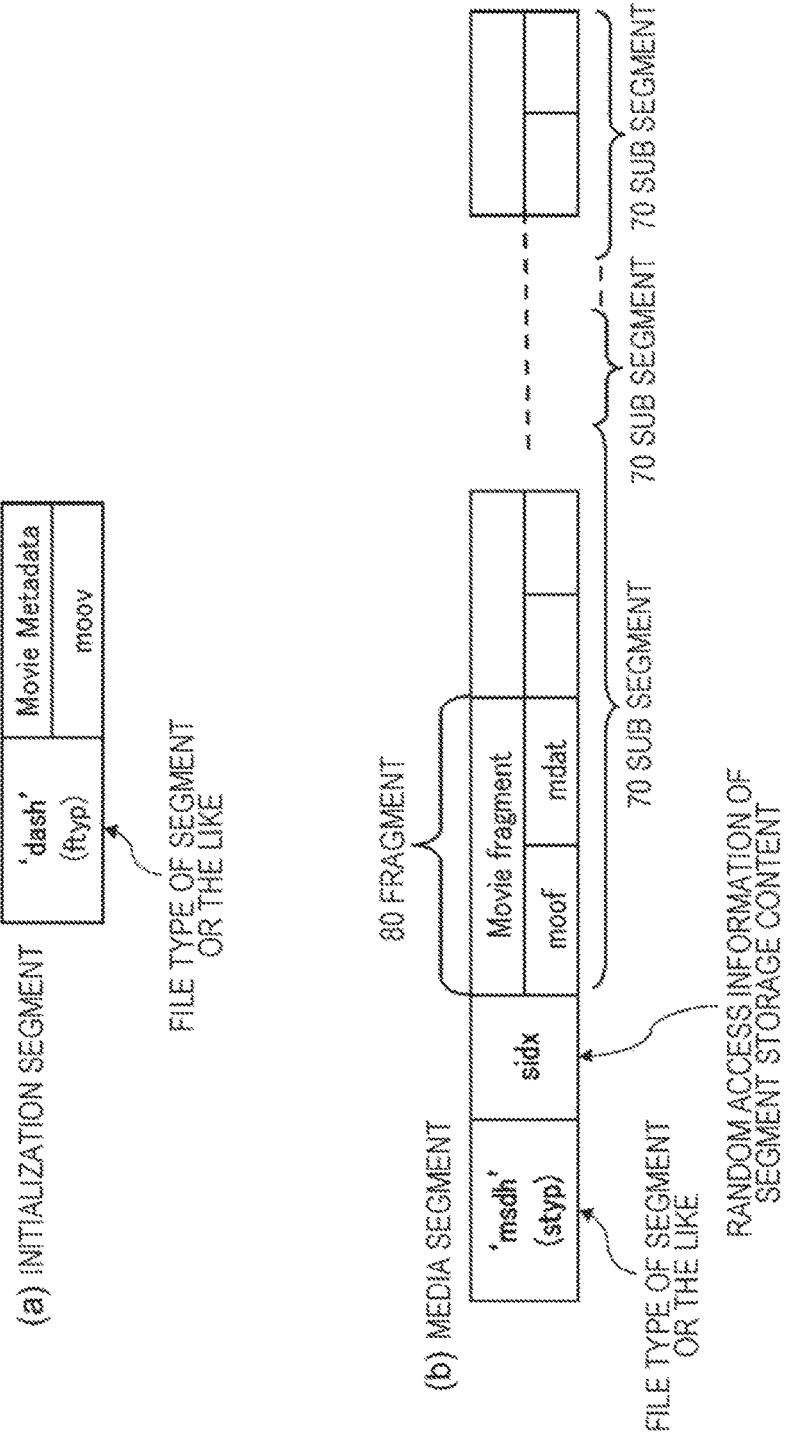
FIG. 3 is a diagram for describing an exemplary configuration of a DASH segment.

As illustrated in FIG. 3, (a) the initialization segment includes the following information:

(a1)) header information (dash) including file type information of a segment; and (a2) metadata (moov) including initialization information such as codec (encoding form) information of media data (mdat) serving as encoded content to be transmitted through the media segment.

Meanwhile, as illustrated in FIG. 3, (b) the media segment includes the following information:

(b1) header information (msdh) including file type information of a segment or the like;

(b2) boundary information of a plurality of sub segments stored in the media segment or access information (sidx) indicating, for example, a random access point of media data (mdat) serving as encoded content stored in the media segment; and (b3) a plurality of sub segments 70.

Each of the plurality of sub segments 70 includes one or more fragments 80.

The fragment 80 includes the following data:

media data (mdat) serving as encoded content serving as a reproduction target; and metadata (moof) corresponding to the media data (mdat).

The random access point recorded in the access information (sidx) of (b) the media segment is called a "SAP" in the DASH.

For example, the SAP indicates a first byte position of a first picture of an image sequence in which all states necessary for decoding a stream can be reset. Specifically, for example, it is information indicating, for example, a position of an I picture of MPEG data.

For example, a presentation time serving as reproduction time information of fragment storage media data (mdat) is recorded in the metadata (moof) corresponding to the media data (mdat) stored in the fragment 80.

Currently, the media data (mdat) stored in one fragment 80 is commonly set to a processing unit (chunk) of a content stream serving as a control target of the DASH. The processing unit (chunk) is, for example, a group of pictures (GOP) serving as a processing unit of moving picture expert group (MPEG) coding.

The GOP is often set as data having a reproduction period of time of about 0.5 to 2 seconds and operated.

However, if data of one GOP unit is used as the media data (mdat) stored in one fragment 80, a delay is likely to occur in the data delivery or the reproduction process, and a trouble is likely to occur in real-time reproduction.

For example, when a live relay image is delivered, the transmission apparatus 20 executes the encoding process on live image data input from a camera, and sequentially generates the media segments 60. When the media data (mdat) stored in each of the fragments 80 of the media segment 60 is encoded data of a GOP unit, the transmission apparatus 30 generates the media data (mdat) serving as the encoded data of the GOP unit, and generates the metadata (moof) describing attribute information such as a presentation time of the generated media data (mdat).

Thus, when each piece of data is generated in this sequence, it is hard to generate the metadata (moof) of the GOP unless a data range of each encoded data of the corresponding GOP unit is decided.

Thus, the metadata (moof) is generated after the data range of the media data (mdat) is decided, and the generation process of each metadata (moof) has to be performed within a period of time corresponding to a period of time (0.5 to 2 seconds) of one GOP unit.

A fragment generation sequence when the media data (mdat) stored in the fragment 80 configuring the media segment 60 is used as the encoded data of the GOP unit will be described with reference to FIG. 4.

Figure 4:
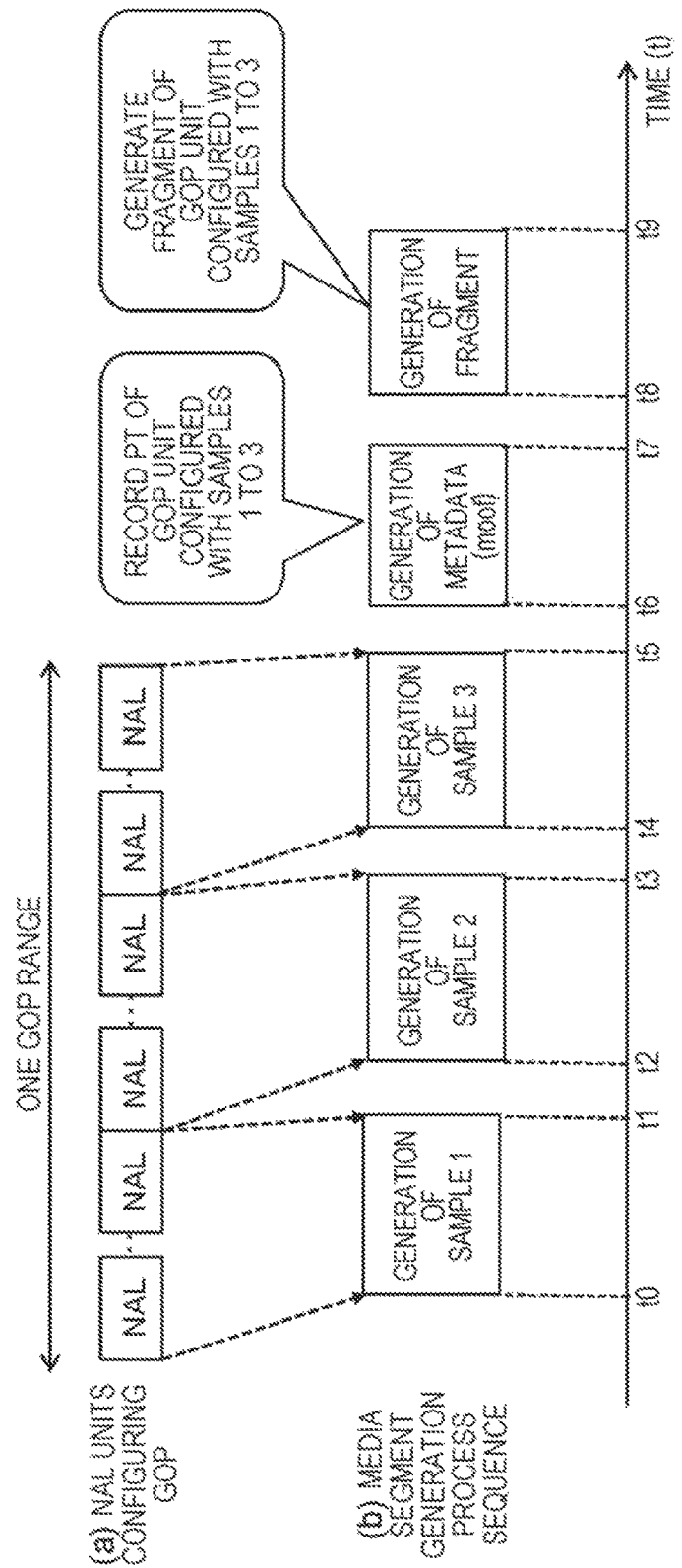
FIG. 4 is a diagram for describing a fragment generation sequence.

An example illustrated in FIG. 4 is a sequence example when the media data (mdat) stored in the media segment 60 is stored according to the MP4 file format (encoding format) specified in the MPEG.

A data portion of the MP4 file format is divided into samples serving as a basic storage unit. Each sample is configured with one or more network abstraction layer (NAL) units. The NAL unit is segmented data of MPEG encoded data, for example, segmented data of a slice unit.

Encoded data corresponding to one GOP is configured with a plurality of NAL units as illustrated in FIG. 4(a).

FIG. 4 illustrates (a) the NAL units configuring the GOP on an upper portion, and (b) a fragment generation process sequence on a lower portion.

A time axis is illustrated on the bottom portion of (b) the fragment generation process sequence. A time passes from the left to the right, and the transmission apparatus 20 executes each process and generates the fragments according to the time axis.

The transmission apparatus generates the media segment storing the generated fragment, then generates the HTTP packet storing the media segment, generates the IP packets storing the HTTP packet, and transmits the IP packet.

The fragment generation process sequence illustrated in FIG. 4(b) will be described.

The transmission apparatus 20 generates the fragment storing the encoded data according to the MP4 file format in the following sequence.

A period of time t0 to t1: a sample 1 storing a plurality of NAL units configuring a GOP is generated.

A period of time t2 to t3: a sample 2 storing a plurality of NAL units configuring a GOP is generated.

A period of time t4 to t5: a sample 3 storing a plurality of NAL units configuring a GOP is generated.

Accordingly, generation of the samples storing all the NAL units configuring one GOP is completed.

The samples 1 to 3 are set as the media data (mdat) in the fragment of the media segment.

A period of time t6 to t7: the metadata (moof) serving as attribute information of GOP encoded data stored in the samples 1 to 3 is generated.

A period of time t8 to t9: a fragment in which the media data (mdat) configured with the samples 1 to 3 is combined with the metadata (moof) of the samples 1 to 3 is generated.

Thereafter, the transmission apparatus 20 generates the media segment including the fragments generated according to the above-described process, generates a packet having the media segment as a payload, and transmits the generated packet to the reception apparatus 30.

At the time of generation of the fragment, the transmission apparatus 20 needs to check, for example, the reproduction period of time of the media data (mdat) of the GOP unit stored in the fragment, generate attribute information of the GOP data unit such as the presentation time according to the reproduction period of time, and record the attribute information in the metadata (moof).

Currently, image data that is subject to data delivery is mainly high-definition-supported image data, but in the future, with the improvement in the image quality, for example, data delivery having a large data amount such as a 4K image is expected to be increased. There is a possibility that a bit rate of a stream will be increased in order to support such large-capacity data delivery.

As the data amount is increased due to the improvement in the image quality, the data amount of each GOP unit is also increased. Thus, if the fragments of one GOP unit are sequentially generated and transmitted as described above with reference to FIG. 4, processing intervals of the transmission side are increased. A data amount of transmission data per unit is also increased. Thus, when it is hard to secure a sufficient communication band, a probability of the occurrence of a transmission delay in network transmission is increased.

In addition, packet reception intervals of the reception apparatus side are increased, a data reception amount per packet is increased, and a data buffer amount required at the reception apparatus side is also increased. Further, when a packet reception error occurs and thus a retransmission process is performed, a delay amount is abruptly increased, and real-time reproduction is likely to collapse.

3. Segmentation Process Configuration of Transmission Data

An exemplary configuration in which a transmission data amount per transmission packet, that is, a transmission data amount per unit is reduced by segmenting transmission data transmitted from the transmission apparatus 20 to the reception apparatus 30 in order to solve the above problems will be described below.

In the fragment generation sequence illustrated in FIG. 4, the media data (mdat) set as the fragment is used as data of one GOP unit, and the metadata (moof) corresponding to the media data (mdat) of one GOP unit is generated. In other words, each metadata (moof) is metadata corresponding to the media data (mdat) of one GOP unit.

In the sequence illustrated in FIG. 4, the generation timing of the metadata (moof) is decided according to the data amount of one GOP. Thus, when the data amount included in one GOP is increased, the generation timing of the metadata (moof) is delayed, and the generation process of the fragment, the generation process of the media segment, and the generation process of the transmission packet is also delayed. As a result, the data amount per packet is increased, a probability of a delivery delay increases.

As a configuration for preventing such a situation, an exemplary configuration in which data obtained by segmenting one GOP other than data of one GOP unit is set as the media data (mdat) in the fragment will be described with reference to FIG. 5.

Figure 5:
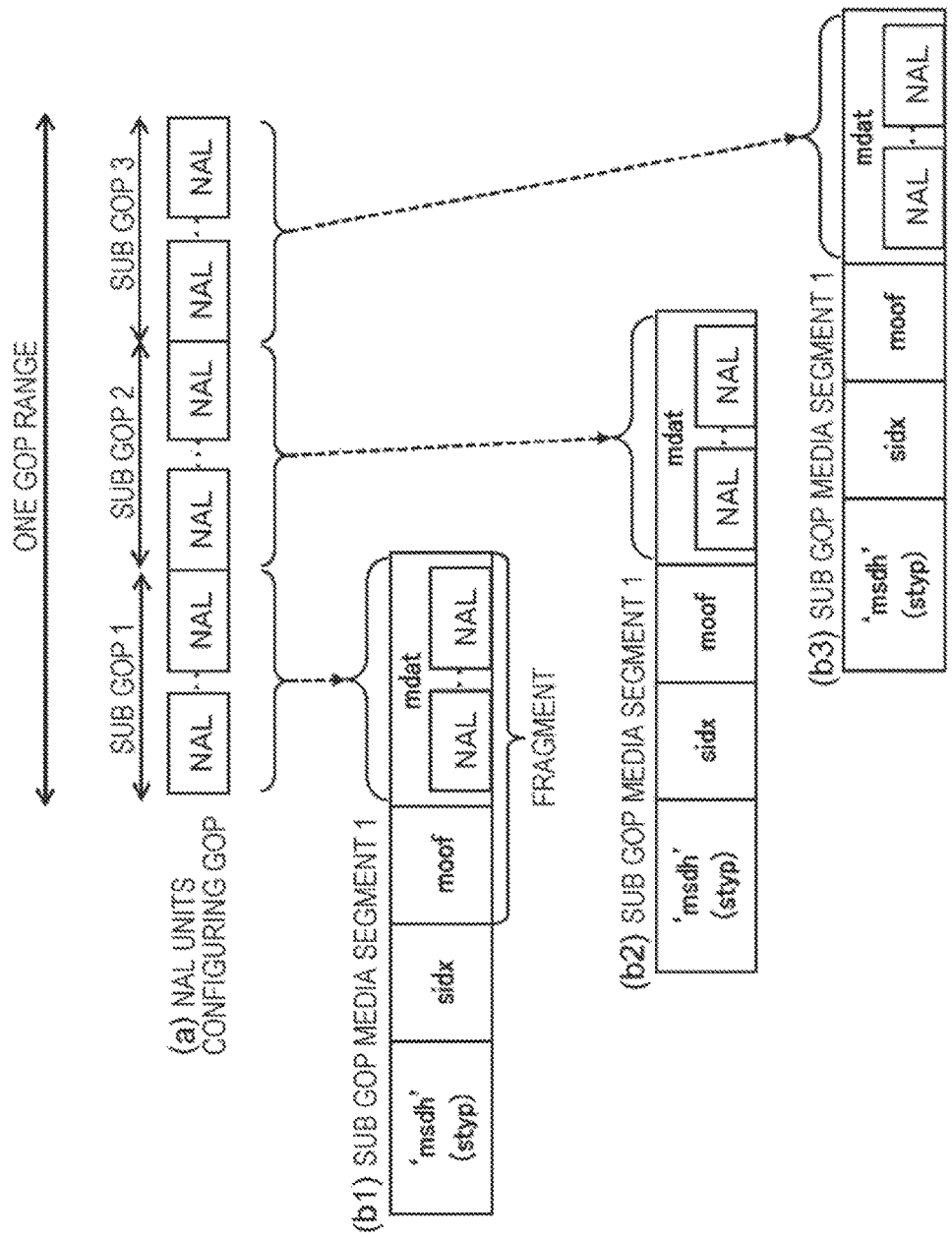
FIG. 5 is a diagram for describing an exemplary configuration in which media data (mdat) in a fragment is set as data obtained by segmenting one GOP other than data of one GOP unit.

FIG. 5 illustrates an example in which data obtained by segmenting one GOP other than data of one GOP unit, specifically, one or more NAL units serving as configuration data of one GOP is set as the media data (mdat) in the fragment.

FIG. 5(*a*) illustrates the NAL units configuring the GOP, similarly to FIG. 4(*a*).

FIGS. 5(*b*1) to 5(*b*3) illustrate a plurality of media segments in which the NAL units serving as configuration data of one GOP are stored as the media data (mdat) in a distributed manner.

As illustrated in FIGS. 5(*b*1) to 5(*b*3), the media segment in which the media data (mdat) configured with one or more NAL units serving as segmented data of GOP data is stored is hereinafter referred to as a "sub GOP media segment."

In FIG. 5, one piece of GOP data is stored in three sub GOP media segments, but the number of sub GOP media segments for storing one GOP data may be set to an arbitrary number of 2 or more.

In all the sub GOP media segments of FIGS. 5(*b*1) to 5(*b*3), a plurality of NAL units are set as the media data (mdat), but one NAL unit may be set as the media data (mdat).

The transmission apparatus 20 generates the sub GOP media segments illustrated in FIGS. 5(*b*1) to 5(*b*3), sets each of the generated sub GOP media segments as a payload of an individual HTTP packet, and transmits the HTTP packet through a network or a broadcast wave.

The metadata (moof) stored in the sub GOP media segments of FIGS. 5(*b*1) to 5(*b*3) is metadata including attribute information corresponding to the media data (mdat) stored in an individual sub GOP media segment.

By performing such a setting, the data amount per packet transmitted through the network or the broadcast wave is reduced, and a period of time required in one packet generation process at the transmission apparatus side is reduced. In addition a probability of a packet delay is reduced, and a retransmission process delay at the time of packet loss is also reduced. As a result, the real-time reproduction having little error is implemented in the reception apparatus 30.

An exemplary configuration of the HTTP packet in which a HTTP header is set to the sub GOP media segment will be described with reference to FIG. 6.

FIG. 6 illustrates two HTTP packet configuration examples.

A difference between packets illustrated in FIGS. 6(*a*) and 6(*b*) lies in whether or not there is [sidx] storing random access information or the like.

sidx is boundary information of a plurality of sub segments stored in the media segment or access information indicating, for example, the random access point of the media data (mdat) serving as the encoded content stored in the media segment as described above with reference to FIG. 3. In the DASH, the access information is called the SAP. For example, the SAP indicates a first byte position of a first picture of an image sequence in which all states necessary for decoding a stream can be reset. Specifically, for example, it corresponds to a position of an I picture of MPEG data.

The HTTP packet illustrated in FIG. 6(*b*) is a packet including no sidx. The HTTP packet illustrated in FIG. 6(*b*) includes no picture data serving as an access point to the media data (mdat) stored in the packet.

When data serving as an access point is not included in the packet storage media data (mdat), data indicating an access point is unnecessary. Thus, sidx is not set to the HTTP packet illustrated in FIG. 6(*b*).

On the other hand, sidx is set to a packet including the sub GOP media segment in which the media data (mdat) including the data serving as the access point is stored as illustrated in FIG. 6(*a*).

In the present embodiment, the configuration data of one GOP are distributed to a plurality of packets and transmitted as described above with reference to FIGS. 5 and 6.

The reception apparatus 30 sequentially receives the plurality of packets, and acquires the configuration data of the GOP stored in the packets in a distributed manner. When the decoding process of the GOP unit is performed, it is necessary to collect all the configuration data of the GOP stored in a plurality of packets and arrange the configuration data (the NAL units) of the GOP in the correct order to reconfigure the GOP data.

A setting example of additional information for smoothly executing a process at the reception apparatus side such as information applied to a GOP reconfiguration process will be described below.

4. Embodiment in which Additional Information is Recorded in HTTP Header

First, an embodiment in which the additional information for smoothly executing a process at the reception apparatus side such as the information applied to the GOP reconfiguration process is recorded in the HTTP header of the HTTP packet will be described.

Record information of the HTTP header will be described with reference to FIGS. 7 and 8.

Figure 7:
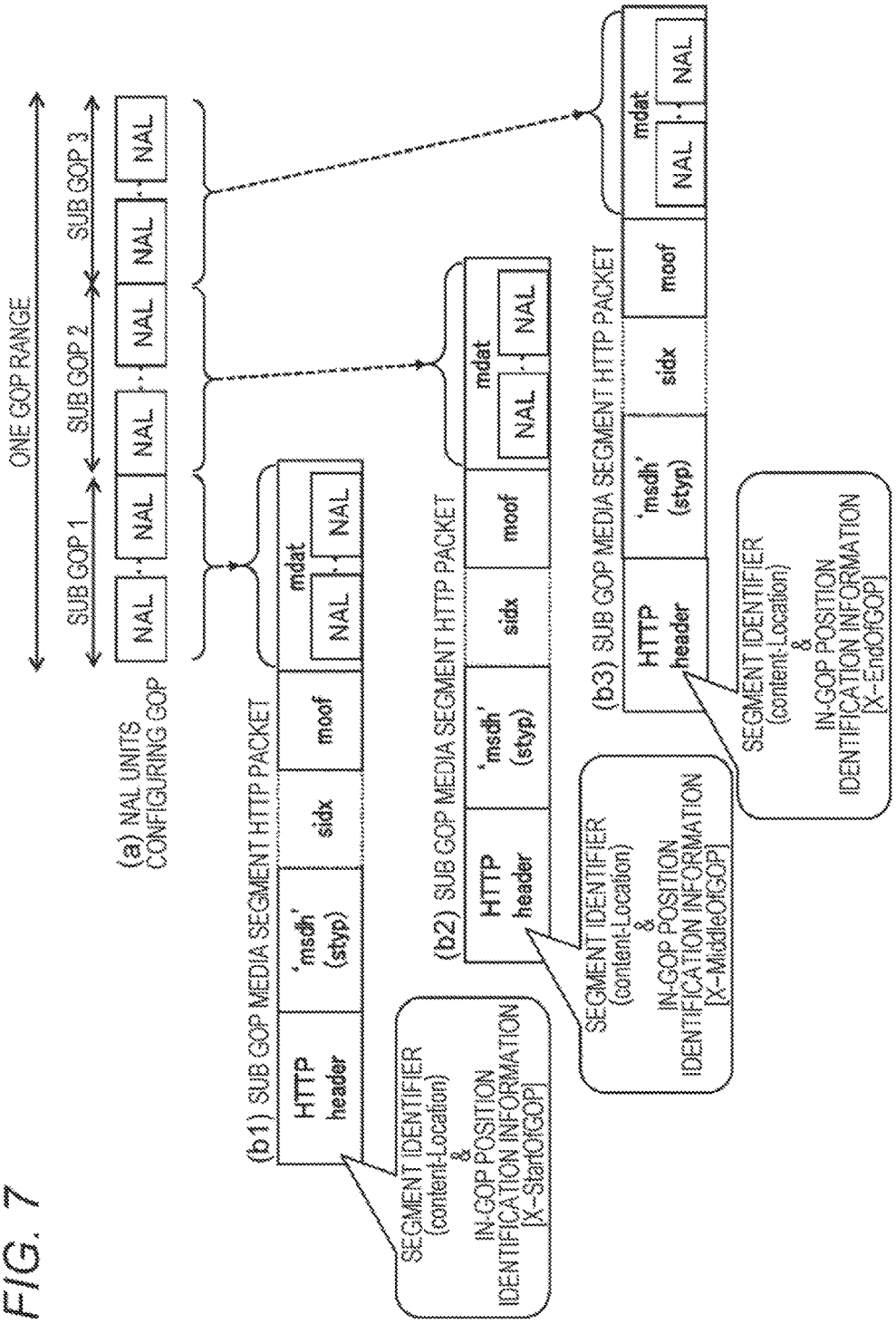
FIG. 7 is a diagram for describing record information of a HTTP header of a media segment HTTP packet.

FIG. 7 illustrates an exemplary configuration of the HTTP packet in which one GOP data is stored in three sub GOP media segments in a distributed manner, similarly to the example described above with reference to FIG. 5.

The following two pieces of identification information are recorded in the HTTP headers of the three HTTP packets as illustrated in FIG. 7:

(1) a segment identifier (Content-Location); and (2) in-GOP position identification information (X-(Start/Middle/End)ofGOP).

(1) The segment identifier is data including content position information of the segment stored in the HTTP packet, a type of segment, and identification information of a GOP to which the media data (mdat) stored in the packet belongs. Specifically, position information (access information such as a URL or the like) of the GOP data may be recorded.

The reception apparatus 30 that receives the packet may determine that the HTTP packet in which the same segment identifier (Content-Location) is recorded is the HTTP packet in which the media data (mdat) belonging to the same GOP is stored.

(2) The in-GOP position identification information is data indicating a position in one GOP at which the media data (mdat) stored in the HTTP packet is located.

A packet in which the in-GOP position identification information is X-StartofGOP is a packet in which the NAL unit in the head region of the GOP data is stored as the media data (mdat).

A packet in which the in-GOP position identification information is X-MiddleofGOP is a packet in which the NAL unit in the intermediate region of the GOP data is stored as the media data (mdat).

A packet in which the in-GOP position identification information is X-EndofGOP is a packet in which the NAL unit in the tail region of the GOP data is stored as the media data (mdat).

Further, when one GOP data is distributed to four or more sub GOP media segments, a plurality of packets in which the in-GOP position identification information=X-Middleof-GOP is set are generated. An arrangement of the media data (mdat) stored in the packets within the GOP data can be determined based on packet header information other than the HTTP header.

For example, the arrangement of the media data (mdat) within the GOP data can be determined with reference to packet sequence numbers recorded in LCT headers of LCT packets storing the HTTP packet. A specific configuration of the transmission packet and a specific configuration of the LCT header will be described later.

Thus, for example, in the configuration in which the HTTP packet is stored in the LCT packet and transmitted, the in-GOP position identification information set to the HTTP header may be set only for the packet storing data in which the GOP position is the head region. In other words, only the in-GOP position identification information=X-StartofGOP may be recorded, and the GOP data subsequent thereto may be arranged with reference to sequence numbers of the LCT headers.

Figure 8:
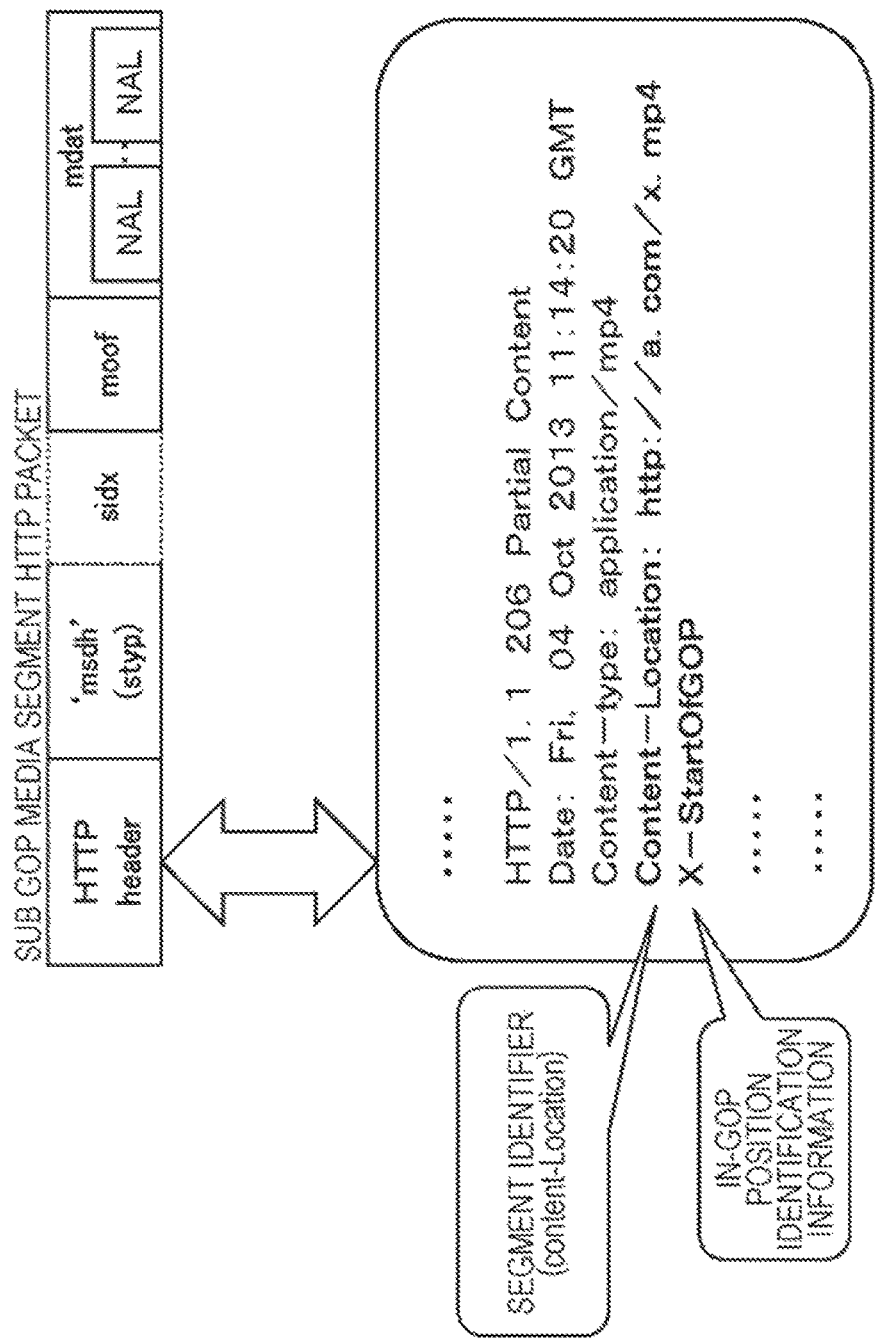
FIG. 8 is a diagram for describing record information of a HTTP header of a media segment HTTP packet.

FIG. 8 illustrates an exemplary data configuration of the HTTP header of the HTTP packet storing the media segment.

For example, the following HTTP header information is recorded in the HTTP header as illustrated in FIG. 8:

```
"...
HTTP/1.1 206 Partial Content
Date: Fri, 04 Oct 2013 11:14:20 GMT
Content-type: application/mp4
Content-Location: http://a.com/x.mp4
X-StartOfGOP
..."
```

In the HTTP header information,
the segment identifier is
"Content-Location: http://a.com/x.mp4."

The segment identifier includes the identification information of the GOP to which the media data (mdat) stored in the HTTP packet belongs. Specifically, the segment identifier is the position information (the access information) of the GOP data.

The HTTP packet in which the same segment identifier (Content-Location) is recorded can be determined to be the HTTP packet in which the media data (mdat) belonging to the same GOP is stored.

In the HTTP header information,
the in-GOP position identification information is
"X-StartOfGOP."

The in-GOP position identification information is data indicating a position in one GOP at which the media data (mdat) stored in the HTTP packet is located.

Any one of the following data is recorded in the HTTP header as the in-GOP position identification information:
"X-StartOfGOP" when the media data (mdat) stored in the HTTP packet is in the head region of one GOP;
"X-MiddleOfGOP" when the media data (mdat) stored in the HTTP packet is in the intermediate region of one GOP; and
"X-EndOfGOP" when the media data (mdat) stored in the HTTP packet is in the tail region of one GOP.

Next, record information of the HTTP header of the HTTP packet in which the initialization segment is stored will be described with reference to FIG. 9.

Segment identification information indicating that the HTTP packet is the packet in which the initialization segment is stored is recorded in the HTTP header of the HTTP packet in which the initialization segment is stored.

Figure 9:
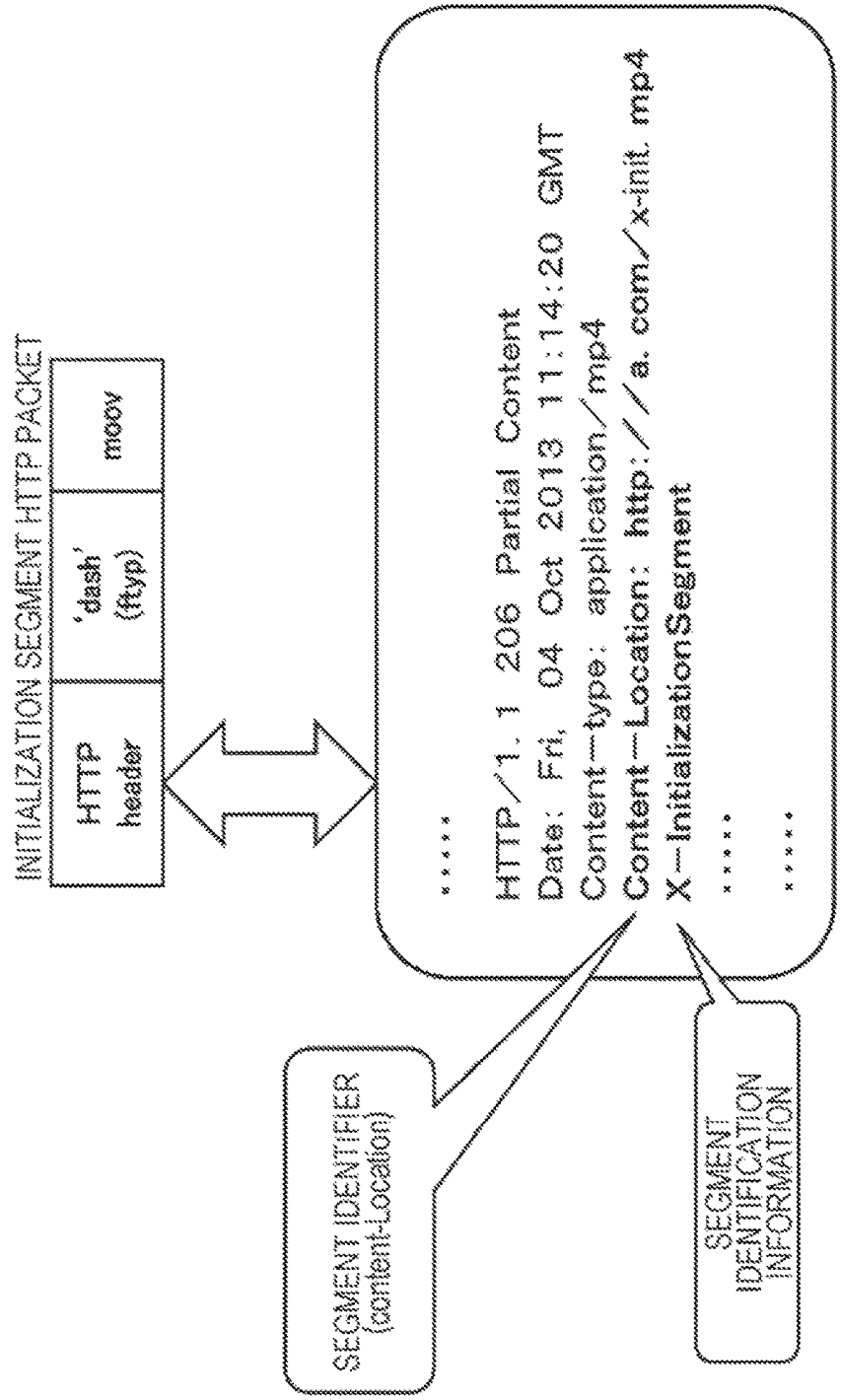
FIG. 9 is a diagram for describing record information of a HTTP header of an initialization segment HTTP packet.

FIG. 9 illustrates an exemplary data configuration of the HTTP header of the HTTP packet in which the initialization segment is stored.

For example, the following HTTP header information is recorded in the HTTP header as illustrated in FIG. 9:

```
"...
HTTP/1.1 206 Partial Content
Date: Fri, 04 Oct 2013 11:14:20 GMT
Content-type: application/mp4
Content-Location:http://a.com/x-init.mp4"
X-InitializationSegment
..."
```

In the HTTP header information,
the segment identifier is
"Content-Location:http://a.com/x-init.mp4."

Access information such as a URL of the initialization segment may be recorded as the segment identifier.

In the HTTP header information,
the segment identification information is
"X-InitializationSegment."

The segment identification information is information indicating that the segment stored in the HTTP packet is the initialization segment.

The segment identification information is recorded in the HTTP header in which the initialization segment is stored.

5. Configuration of Packet

Next, an exemplary configuration of the packet transmitted from the transmission apparatus to the reception apparatus will be described.

FIG. 10 illustrates exemplary configurations of the following two IP packets:
(1) an initialization segment storage IP packet; and
(2) a media segment storage IP packet.
(1) The initialization segment storage IP packet has the following configuration:
an IP header;
a UDP header;
an LCT header;
a HTTP header;
initialization segment configuration data [dash]; and
initialization segment configuration data [moov].

The IP header, the UDP header, the LCT header, and the HTTP header are header information that is set according to communication protocols of an IP protocol, a UDP protocol, a FLUTE protocol, and a HTTP protocol, respectively.

Meanwhile, (2) the media segment storage IP packet has the following configuration:

an IP header;
a UDP header;
an LCT header;
a HTTP header;
media segment configuration data [msdh];
media segment configuration data [sidx];
media segment configuration data [moof]; and
media segment configuration data [mdat].

The IP header, the UDP header, the LCT header, and the HTTP header are header information that is set according to communication protocols of an IP protocol, a UDP protocol, a FLUTE protocol, and a HTTP protocol, respectively.

As described above, the media segment configuration data [sidx] is set to packets having the media data (mdat) applicable to random access but not set to the other packets.

The transmission apparatus 20 generates the IP packets illustrated in FIG. 10, and transmits the generated IP packets to the reception apparatus 30.

The reception apparatus 30 receives the packets illustrated in FIG. 10 received from the reception apparatus 20, analyzes the header information, acquires the segment, and executes the initial setting or content reproduction according to segment storage data.

6. Configurations and Processes of Transmission Apparatus and Reception Apparatus Next, configurations and processes of the transmission apparatus and the reception apparatus will be described with reference to FIG. 11 and the subsequent drawings.

First, configurations of the transmission apparatus 20 and the reception apparatus 30 and a protocol stack will be described with reference to FIG. 11.

Figure 11:
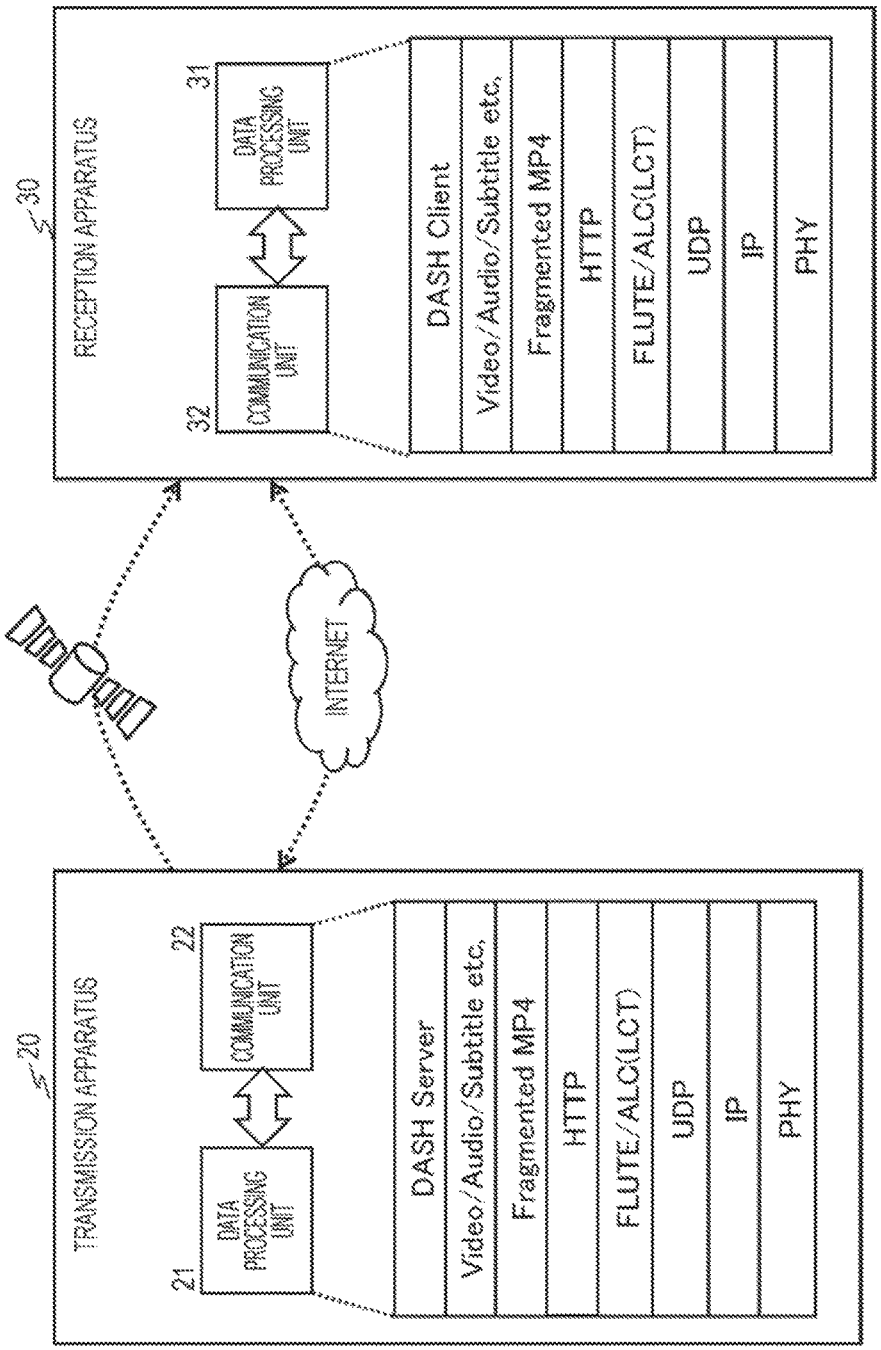
FIG. 11 is a diagram for describing a protocol stack of a transmission apparatus and a reception apparatus.

The transmission apparatus 20 that generates and transmits the IP packets described above with reference to FIG. 10 includes a data processing unit 21 and a communication unit 22 as illustrated in FIG. 11.

The data processing unit 21 executes the generation process of the transmission packet.

Specifically, for example, as described above, the media data (mdat) including only some configuration data of a group of pictures (GOP) serving as a processing unit of encoded data and the sub GOP media segment in which the metadata (moof) corresponding to the media data is stored are generated as packet storage data. Further, a packet in which additional packet information such as an in-GOP position identifier identifying an in-GOP position of the media data serving as the storage data of the sub GOP media segment is generated and recorded in the HTTP header is generated.

The communication unit 22 transmits the packet generated by the data processing unit 21.

The communication unit 22 performs broadcast delivery or multicast delivery of the packet generated by the data processing unit 21 through the broadcast wave or the network such as the Internet.

The data processing unit 21 and the communication unit 22 perform the packet generation process and transmission of the generated packet according to a protocol stack including the following layers. A layer configuration of the protocol stack of the transmission apparatus 20 will be described below. The protocol stack of the transmission apparatus 20 has the following layer configuration from an upper layer to a lower layer:

(1) DASH Server: an application layer in which a process such as segment generation according to the DASH standard is performed;

(2) Video/Audio/Subtitle etc: an application layer in which generation and acquisition of transmission target content are performed;

(3) FragmentedMP4: an application layer in which encoded data according to the MP4 file format is generated, and a segment is generated;

(4) HTTP: a layer in which a HTTP packet including a HTTP header is generated according to the HTTP protocol;

(5) FLUTE/ALC(LCT): a layer in which a FLUTE packet including an LCT header is generated according to the FLUTE protocol;

(6) UDP: a layer in which a UDP packet including a UDP header is generated according to the UDP protocol;

(7) IP: a layer in which an IP packet including an IP header is generated according to an IP protocol; and (8) PHY: a physical layer configured with, for example, a communication unit that generates and transmits an IP packet or a MAC frame storing an IP packet or the like.

The reception apparatus 30 that receives the IP packet described above with reference to FIG. 10 includes a data processing unit 31 and a communication unit 32 as illustrated in FIG. 11.

The communication unit 32 receives the packet transmitted by the transmission apparatus 20, and the data processing unit 31 receives the packet received by the communication unit 31 and performs data processing on the packet.

The data processing unit 31 and the communication unit 32 execute reception and analysis of the packet according to a protocol stack including the following layers. The protocol stack of the reception apparatus 30 has the following layer configuration from an upper layer to a lower layer:

(1) DASH Client: an application layer in which a process such as analysis of a segment according to the DASH standard is executed;

(2) Video/Audio/Subtitle etc: an application layer in which, for example, acquisition and a reproduction process of reception content are executed;

(3) FragmentedMP4: an application layer in which, for example, a decoding process of encoded data according to the MP4 file format is executed;

(4) HTTP: a layer in which a HTTP packet including a HTTP header is analyzed according to the HTTP protocol;

(5) FLUTE/ALC(LCT): a layer in which a FLUTE packet including an LCT header is analyzed according to the FLUTE protocol;

(6) UDP: a layer in which a UDP packet including a UDP header is analyzed according to the UDP protocol;

(7) IP: a layer in which an IP packet including an IP header is analyzed according to the IP protocol; and (8) PHY: a physical layer configured with, for example, a communication unit that receives an IP packet or a MAC frame storing an IP packet.

As described above, when the IP packet is broadcast or multicast, the transmission apparatus 20 performs a transmission process using transmission via a network, a transmission process using a broadcast wave, or a parallel transmission process using communication paths of the both transmissions.

The reception apparatus 30 performs a packet reception process using a communication path of either of the broadcast wave and the network such as the Internet or both communication paths.

Generation and analysis of packets transmitted or received via the network such as the Internet may be performed by replacing the FLUTE/ALC(LCT) layer and the UDP layer illustrated in FIG. 11 with the TCP layer.

An example of the protocol stack of the reception apparatus 30 that performs a process of appropriately switching the IP packet received through the broadcast wave and the IP packet received via the network such as the Internet will be described with reference to FIG. 12.

Figure 12:
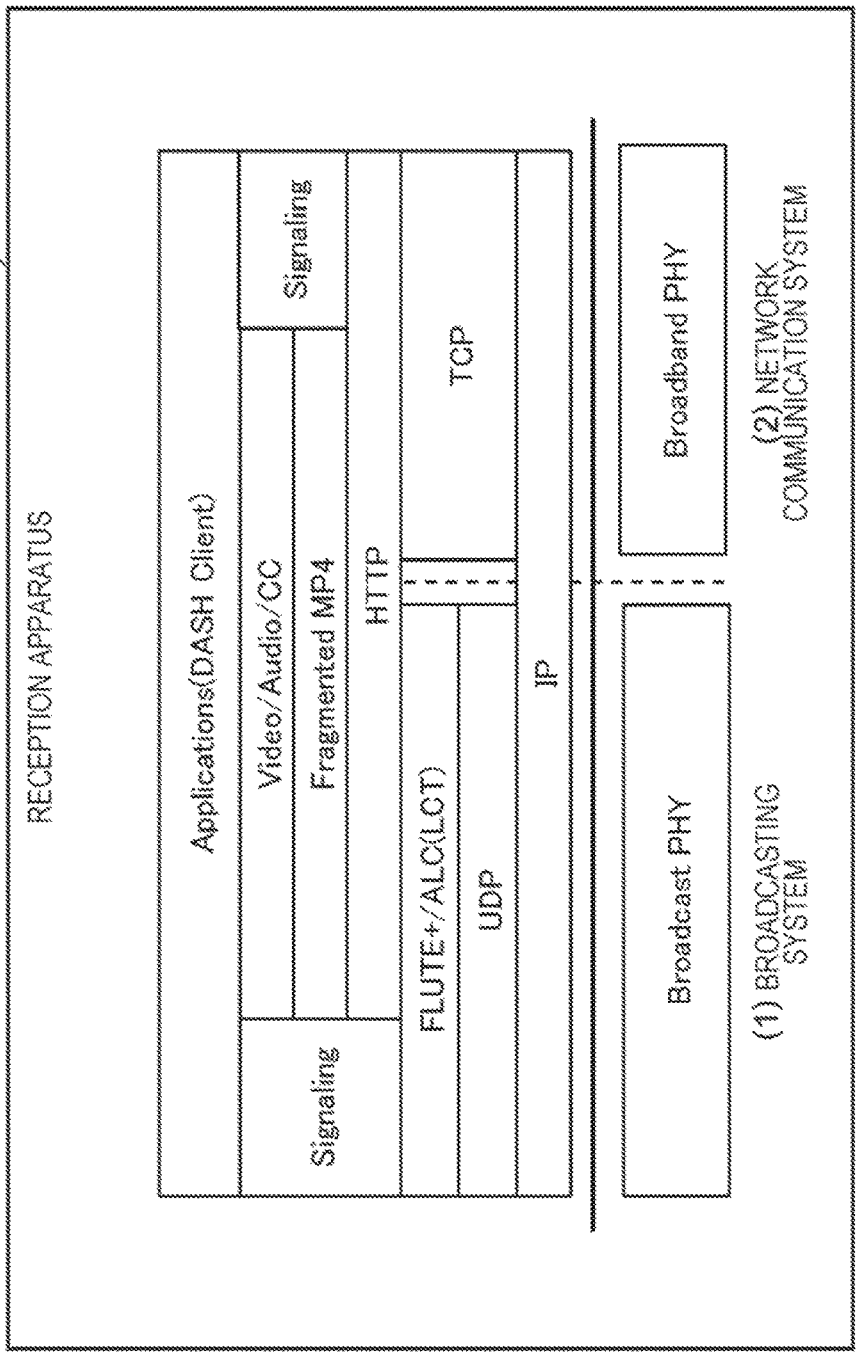
FIG. 12 is a diagram for describing a protocol stack of a reception apparatus.

In the protocol stack of the reception apparatus 30 illustrated in FIG. 12, a layer configuration of a protocol stack corresponding to the following two communication systems is illustrated.

(1) a broadcasting system; and
(2) a network communication system.

(1) The broadcasting system has the layer configuration described above with reference to FIG. 11.

(2) The network communication system has a configuration in which the FLUTE/ALC(LCT) layer and the UDP layer of the broadcasting system layer are replaced with the TCP layer.

In the TCP layer, a TCP packet including a TCP header is analyzed.

A signaling layer is a layer for performing switching control of the communication systems.

By appropriately switching and using the layers of the broadcasting system and the network communication system, the reception apparatus 30 can acquire packet storage content selectively using the packet received through the broadcast wave or the packet received via the network such as the Internet and execute the reproduction process.

For example, when there is a delay in packet reception from the network, switching to the broadcasting system is performed, a packet corresponding to the same content is received through the broadcast wave, and thus content reproduction can be continued.

The segment identifier and the in-GOP position identifier are recorded in the packet delivered through either of the network communication system and the broadcasting system, and thus the GOP data can be reconstructed with reference to the identification information, and the decoding process and the content reproduction are implemented with no error.

7. Configuration in which Access Point Information for Identifying Whether or Not NAL Unit Stored in Packet Includes Stream Access Point (SAP) is Added Next, as an exemplary configuration for implementing efficient processing of the reception apparatus, a configuration in which identification information for identifying whether or not the SAP (access point data) is included in the NAL unit serving as a division source of the NAL unit fragment stored in the packet will be described.

As described above with reference to the drawings including FIG. 3, the stream access point (SAP) is storage position information of the data serving as the random access point. In the DASH, the random access point is called the SAP. For example, the SAP indicates a first byte position of a first picture of an image sequence in which all states necessary for decoding a stream can be reset. Specifically, for example, it is information indicating, for example, a position of an I picture of MPEG data.

As described above with reference to FIG. 3(b), the SAP is stored in [sidx] serving as meta information of the media segment.

The reception apparatus side can acquire encoded data at a data position indicated by the SAP and perform reproduction by executing the decoding process on the acquired data.

Thus, when a special reproduction process is performed, for example, when reproduction is performed from the middle of content, the SAP becomes important and essential data. For example, by acquiring encoded data designated by the SAP without arranging all the GOP data and decoding the encoded data, the image of the random access point can be reduced.

Further, for example, when the packets of all the encoded data of the GOP unit are not received in time due to the delivery delay or the like, the random access point data designated by the SAP may be preferentially processed. By selecting, decoding, and reproducing the random access point data, an image can be continuously displayed on a display unit. As described above, even when a processing priority is determined, the SAP becomes important data.

There is certainly the random access point in one GOP unit data. However, as described above with reference to FIGS. 5 to 10, in the packet storing one or more NAL units into which one GOP of storage data of one packet is segmented instead of data of one GOP unit, the random access point may or may not be included in the NAL unit stored in the packet.

In the configuration described above with reference to FIGS. 5 to 10, a packet including "sidx" serving as metadata and a packet including no "sidx" serving as metadata are set as a sub GOP media segment HTTP packet, for example, as illustrated in FIG. 7.

When data corresponding to the random access point is included in the NAL unit stored in the sub GOP media segment HTTP packet, [sidx] storing the SAP is set.

However, [sidx] is not only the SAP serving as the random access point information of the media data but also metadata including the boundary information of the other data as well, and it is hard to determine whether or not the data serving as the access point is included in the packet storage data depending on the presence or absence of [sidx].

Thus, in the encoded data delivery configuration using the sub GOP media segment HTTP packet, it is difficult for the reception apparatus side to determine whether or not the access point data is included in the packet in units of received packets.

A configuration that enables the reception apparatus side determine whether or not the access point data is included in the packet in units of received packets in order to solve the above problems will be described below.

A configuration that enables the reception apparatus side determine whether or not the access point data is included in the packet in units of packets in the encoded data delivery configuration using the sub GOP media segment HTTP packet will be described with reference to FIG. 13 and the drawings subsequent thereto.

Figure 13:
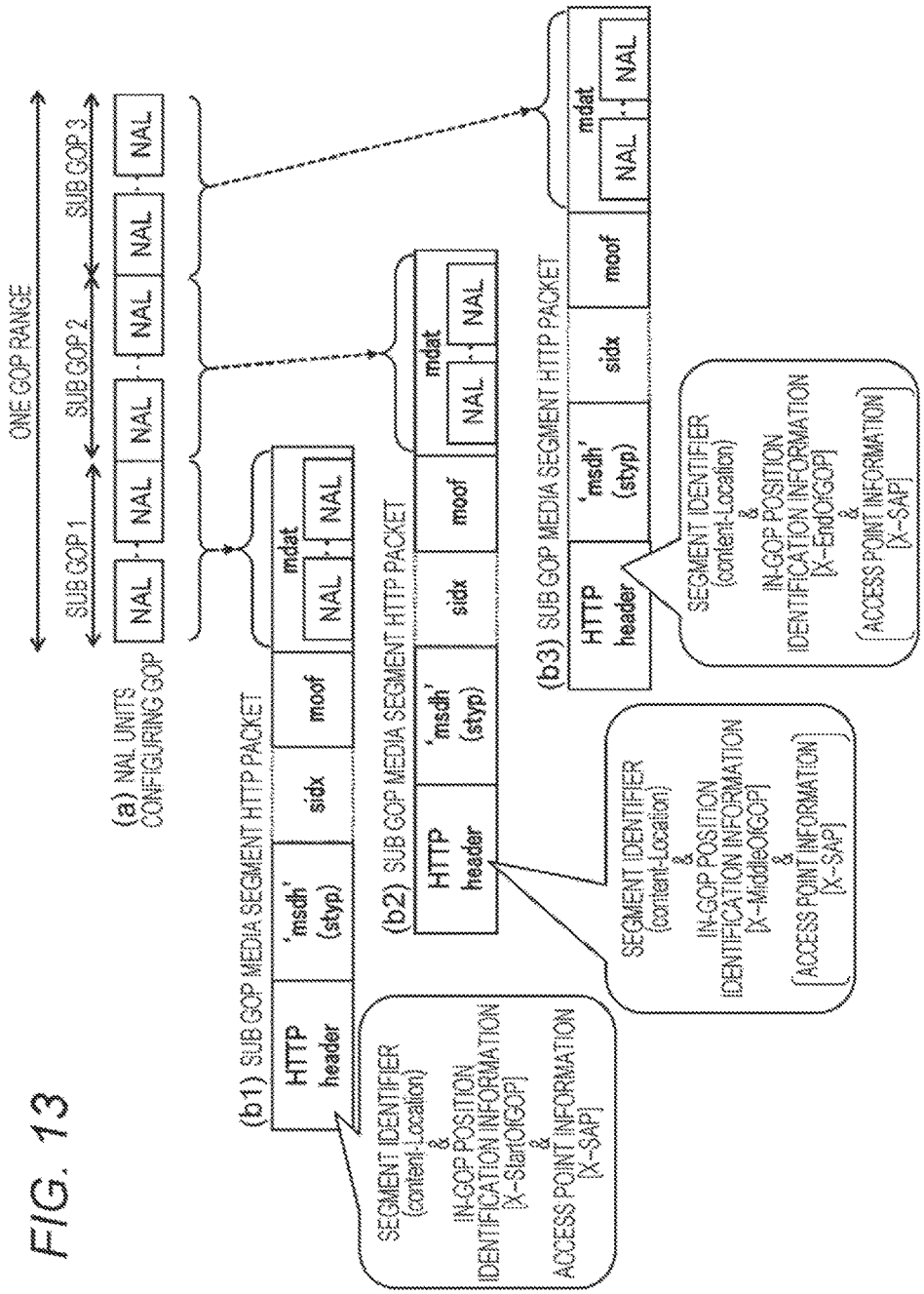
FIG. 13 is a diagram for describing record information of a HTTP header of a media segment HTTP packet.

FIG. 13 illustrates an exemplary configuration of a HTTP packet in which one GOP data is stored in three sub GOP media segments in a distributed manner, similarly to the examples of FIGS. 5 and 7 described above.

The following additional information described above with reference to FIG. 7 is recorded in the HTTP headers of the three HTTP packets:

(1) the segment identifier (Content-Location); and
(2) the in-GOP position identification information (X-(Start/Middle/End)ofGOP).

Further, in the example illustrated in FIG. 13, the following additional information is additionally recorded in the HTTP header:

(3) access point information (X-SAP).

The three pieces of information are recorded.

(1) The segment identifier is data including content position information of the segment stored in the HTTP packet, a type of segment, and identification information of a GOP to which the media data (mdat) stored in the packet belongs. Specifically, position information (access information such as a URL or the like) of the GOP data may be recorded.

The reception apparatus 30 that receives the packet may determine that the HTTP packet in which the same segment identifier (Content-Location) is recorded is the HTTP packet in which the media data (mdat) belonging to the same GOP is stored.

(2) The in-GOP position identification information is data indicating a position in one GOP at which the media data (mdat) stored in the HTTP packet is located.

A packet in which the in-GOP position identification information is X-StartofGOP is a packet in which the NAL unit in the head region of the GOP data is stored as the media data (mdat).

A packet in which the in-GOP position identification information is X-MiddleofGOP is a packet in which the NAL unit in the intermediate region of the GOP data is stored as the media data (mdat).

A packet in which the in-GOP position identification information is X-EndofGOP is a packet in which the NAL unit in the tail region of the GOP data is stored as the media data (mdat).

Further, when one GOP data is distributed to four or more sub GOP media segments, a plurality of packets in which the in-GOP position identification information=X-MiddleofGOP is set are generated. An arrangement of the media data (mdat) stored in the packets within the GOP data can be determined based on packet header information other than the HTTP header.

For example, the arrangement of the media data (mdat) within the GOP data can be determined with reference to packet sequence numbers recorded in LCT headers of LCT packets storing the HTTP packet. A specific configuration of the transmission packet and a specific configuration of the LCT header will be described later.

Thus, for example, in the configuration in which the HTTP packet is stored in the LCT packet and transmitted, the in-GOP position identification information set to the HTTP header may be set only for the packet storing data in which the GOP position is the head region. In other words, only the in-GOP position identification information=X-StartofGOP may be recorded, and the GOP data subsequent thereto may be arranged with reference to sequence numbers of the LCT headers.

(3) The access point information (X-SAP) is information indicating whether or not the data serving as the random access point is included in the encoded data included in the media data (mdat) stored in the HTTP packet.

The reception apparatus can immediately determine whether or not the NAL unit in the media data stored in the HTTP packet includes the access point data with reference to the access point information (X-SAP).

Thus, for example, when only the access point data is preferentially decoded and reproduced, a processing target packet can be selected with reference to the access point information (X-SAP) recorded in the HTTP header. In other words, only the packet in which the access point information (X-SAP) recorded in the HTTP header indicates that the access point is included in the packet storage data (the NAL unit) can be selected and processed.

In the example illustrated in FIG. 13, the access point information (X-SAP) is set to all the HTTP packets of FIGS. 13(b1) to 13(b3), and the access point information (X-SAP) indicates whether or not the data serving as the random access point is included in the encoded data included in the media data (mdat) stored in each HTTP packet.

Besides such a configuration, for example, only when the data serving as the random access point is included in the encoded data included in the media data (mdat) stored in the HTTP packet, the access point information (X-SAP) may be recorded in the HTTP header of the HTTP packet. In other words, when the data serving as the random access point is not included in the encoded data included in the media data (mdat) stored in the HTTP packet, the access point information (X-SAP) is not recorded in the HTTP header. For example, when the data serving as the random access point is not included in the HTTP packets illustrated in FIGS. 13(b2) and 13(b3), the access point information (X-SAP) is not recorded in the HTTP header.

In the case of this setting, the reception apparatus determines whether or not the data serving as the random access point is included in the encoded data included in the media data (mdat) stored in the HTTP packet according to whether or not the access point information (X-SAP) is recorded in the HTTP header.

The access point information (X-SAP) is information identifying the presence or absence of randomly accessible data in units of packets. The reception apparatus side can identify the packet storing randomly accessible data with reference to the access point information (X-SAP) of each packet. For example, by preferentially processing the packet storing randomly accessible data, the reception apparatus can rapidly perform, for example, the data reproduction process from the random access point.

Figure 14:
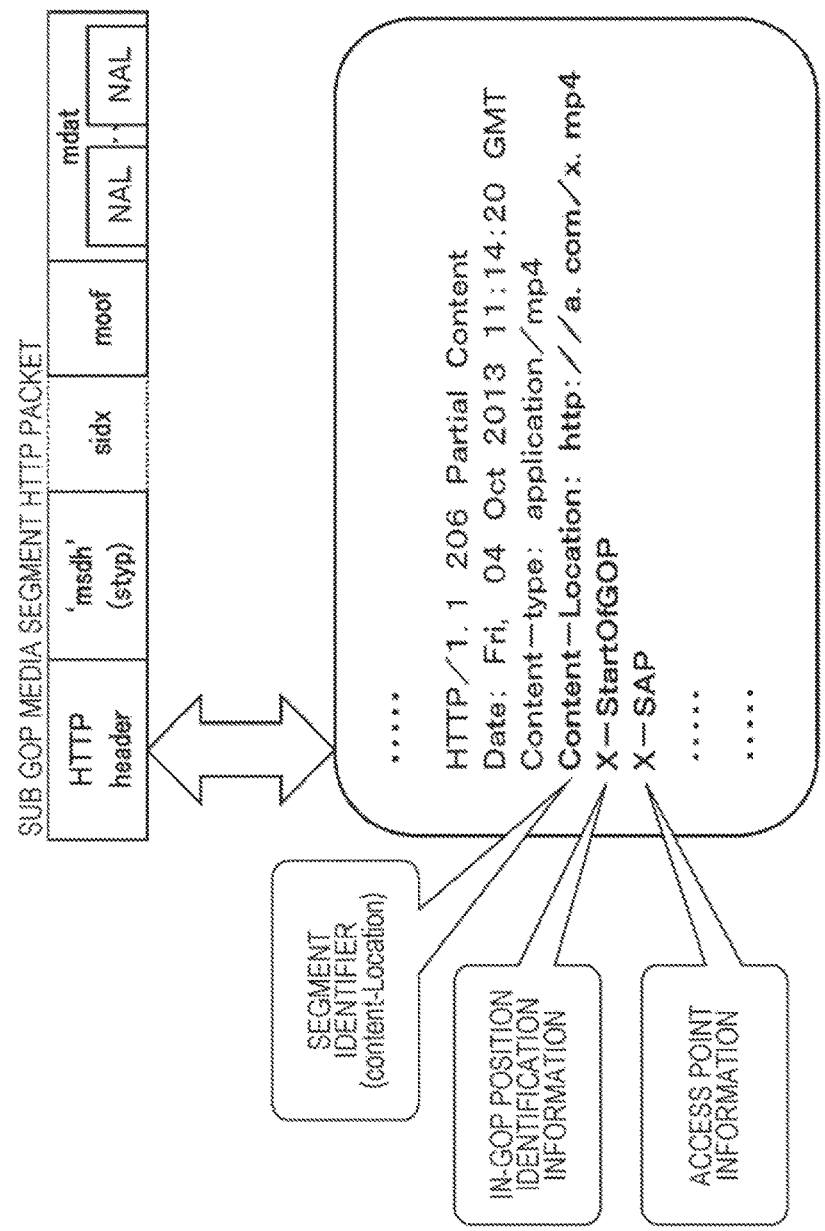
FIG. 14 is a diagram for describing record information of a HTTP header of a media segment HTTP packet.

FIG. 14 illustrates an exemplary data configuration of the HTTP header of the HTTP packet storing the media segment.

For example, the following HTTP header information is recorded in the HTTP header as illustrated in FIG. 14:

---

"...
HTTP/1.1 206 Partial Content
Date: Fri, 04 Oct 2013 11:14:20 GMT
Content-type: application/mp4
Content-Location: http://a.com/x.mp4
X-StartOfGOP
X-SAP
..."

---

In the HTTP header information, the segment identifier "Content-Location: http//:a.com/x.mp4" and the in-GOP position identification information "X-StartOfGOP" are the same information as the information described above with reference to FIG. 8.

In other words, the segment identifier is the position information (the access information) of the GOP data serving as the identification information of the GOP to which the media data (mdat) stored in the HTTP packet belongs.

The in-GOP position identification information is data indicating a position in one GOP at which the media data (mdat) stored in the HTTP packet is located.

Any one of the following data is recorded in the HTTP header as the in-GOP position identification information:

"X-StartOfGOP" when the media data (mdat) stored in the HTTP packet is in the head region of one GOP;

"X-MiddleOfGOP" when the media data (mdat) stored in the HTTP packet is in the intermediate region of one GOP; and "X-EndOfGOP" when the media data (mdat) stored in the HTTP packet is in the tail region of one GOP.

In the HTTP header information illustrated in FIG. 14, the access point information "X-SAP" is information indicating whether or not the data serving as the random access point is included in the encoded data included in the media data (mdat) stored in the HTTP packet (NAL).

The reception apparatus can immediately determine whether or not the access point is included in the NAL unit in the packet storage media data in units of received packets with reference to the access point information (X-SAP).

The reception apparatus can select only the packet including the access point and preferentially decode and reproduce the storage data of the packet. For example, when the packets of all the encoded data of the GOP unit are not received in time due to the delivery delay or the like, an image can be continuously displayed on a display unit by preferentially decoding and reproducing the random access point data.

8. Communication Processing Configuration Using NAL Unit Fragment Storage Packet Obtained by Further Dividing NAL Unit As described above, by transmitting and receiving data using the packet including one or more NAL units serving as divisional data of the GOP, the data amount per transfer packet on the network is reduced.

However, for example, for image data having a large data amount such as 4K content or 8K content serving as high-quality image data, the data amount of the NAL unit generated by an encoding process of large-capacity image data is increased. In other words, the case in which the data amount of one NAL unit is very large is considered.

In a data transfer process in the IP layer, for example, when data transfer is performed via the Ethernet (a registered trademark), it is necessary to generate and transfer the IP packet using a MAC frame equal to or less than a maximum data transfer unit (a maximum transfer unit (MTU)) specified in the Ethernet (a registered trademark).

In other words, when a packet is transferred via a network in which the maximum data transfer unit (MTU) is specified, it is necessary to perform a fragment process of dividing the IP packet having the data amount of the MTU or more into divisional data having a data amount specified by the MTU or less and a process of generating and transferring a plurality of MAC frames each of which stores the divisional data.

For example, a maximum data transfer amount (MTU) of a frame unit of the MAC frame specified in the Ethernet (a registered trademark) is about 1,500 bytes.

Figure 15:
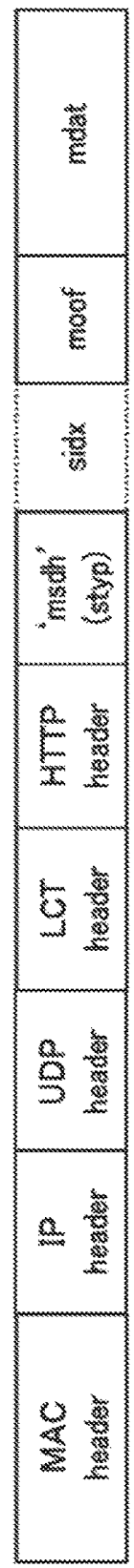
FIG. 15 is a diagram for describing a configuration of a MAC frame.

The MAC frame has, for example, a configuration illustrated in FIG. 15, that is, a configuration in which a MAC header is set to the header of the IP packet described above with reference to FIG. 10. For example, in a MAC frame illustrated in FIG. 15, it is necessary to set the data amount of the IP header to the media data mdat serving as the payload of the MAC frame such that the MTU is 1,500 bytes or less.

When packet transmission from the transmission apparatus 20 to the reception apparatus 30 is performed, fragmentation according to the MTU, that is, the packet division process and the divisional data reconfiguration process are likely to be repeatedly performed in communication between the transmission apparatus 20 and the reception apparatus 30 or a relay apparatus or the like between the transmission apparatus 20 and the reception apparatus 30.

If such a situation occurs, a possibility that a period of time from a content input in the transmission apparatus 20 to content reproduction in the reception apparatus 30 will be delayed, and a content reproduction delay will occur in the reception apparatus 30 is increased.

A configuration for preventing such a situation will be described below.

In an embodiment to be described below, the transmission apparatus 20 sets a data size of a packet to be a predetermined size or less in the HTTP layer at the stage of the packet generation process. Specifically, a data size of a packet is set to a data size equal to or less than the maximum data transfer unit (MTU) assumed in a communication path. Specifically, for example, a packet storing NAL unit fragments obtained by further dividing one NAL unit is generated and transmitted.

As described above, for example, a general maximum data transfer amount (MTU) of a frame unit of the MAC frame specified in the Ethernet (a registered trademark) is about 1,500 bytes.

The data processing unit of the transmission apparatus 20 performs packet generation in view of the MTU at the stage of generation of the HTTP packet. For example, the packet generation is performed so that a frame size of the MAC frame storing the HTTP packet is 1,500 bytes or less.

By performing the packet generation process in view of the maximum data transfer amount (MTU) in the communication path through the data processing unit of the transmission apparatus 20, the fragmentation serving as the packet division process according to the MTU in the IP layer of the transmission apparatus, the relay apparatus, or the reception apparatus is unnecessary, and the data transfer can be smoothly performed.

As described above, the data processing unit of the transmission apparatus 20 performs the process of setting packet storage data as a fragment equal to or less than the MTU specified in the communication path at the stage of generation of the HTTP packet. Through this process, for example, an overhead by the fragmentation process in the IP layer of the communication path is reduced.

In the example described above with reference to the drawings including FIG. 5, one or more NAL units are used as the media data (mdat) and combined with the metadata (moof) serving as attribute data to generate one fragment, and a HTTP packet storing a sub GOP media segment including the fragment is generated.

In an embodiment to be described below, a HTTP packet storing NAL unit fragments (NALf) obtained by dividing one NAL unit as media data (mdat) is generated.

Further, the attribute data (moof) corresponding to the NAL unit is stored in an independent separate HTTP packet different from a media data (mdat) storage packet and delivered.

An exemplary configuration of the HTTP packet in the present embodiment will be described with reference to FIG. 16.

FIG. 16(a) illustrates the sub GOP media segment described above with reference to FIGS. 5 to 7 and the like.

In other words, it is a segment in which one or more NAL units serving as data obtained by dividing the GOP is stored as the media data (mdat).

However, the sub GOP media segment illustrated in FIG. 16(a) is an example in which only one NAL unit is stored as the media data (mdat). The number of NAL units is not limited to 1, and a plurality of NAL units may be stored.

In the present embodiment, a plurality of HTTP packets are generated by further dividing the sub GOP media segment illustrated in FIG. 16(a). The division process is performed in view of the maximum data transfer amount (MTU) in the communication path. For example, when the MAC frame storing the divided HTTP packet is generated, the division process is performed so that a data amount is equal to or less than the maximum data transfer unit (MTU) permitted in the MAC frame.

At the time of the division process, a NAL unit division process of dividing one or more NAL units is performed. Hereinafter, data obtained by dividing the NAL unit is referred to as a "NAL unit fragment (NALf)."

Further, a HTTP packet generated by dividing the configuration data of the sub GOP media segment is referred to as a "NAL unit fragment correspondence HTTP packet."

Figure 16:
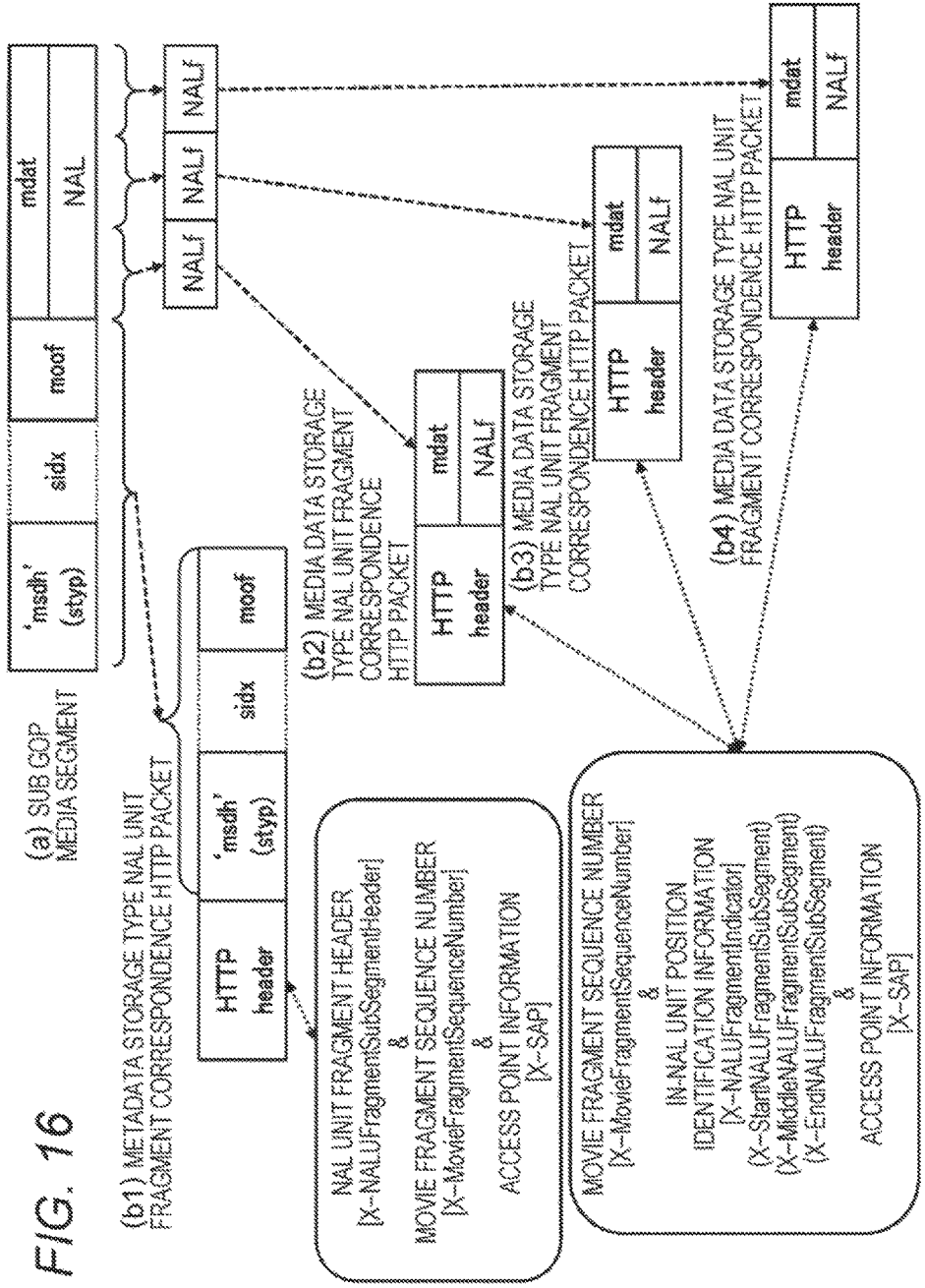
FIG. 16 is a diagram for describing a NAL unit fragment correspondence HTTP packet.

In the example illustrated in FIG. 16, the configuration data of the sub GOP media segment illustrated in FIG. 16(a) is divided into four HTTP packets (b1) to (b4).

In each of the four NAL unit fragment correspondence HTTP packets illustrated in FIGS. 16(b1) to 16(b4), when the HTTP packet has the MAC frame configuration illustrated in FIG. 15, the data amount of the data portion excluding the MAC header is set to be 1,500 bytes or less.

The NAL unit fragment correspondence HTTP packet illustrated in FIG. 16(b1) is a HTTP packet storing the metadata region of the sub GOP media segment illustrated in FIG. 16(a), that is, metadata such as msdh (stype), sidx, and moof. In other words, the NAL unit fragment correspondence HTTP packet illustrated in FIG. 16(b1) is a metadata storage type NAL unit fragment correspondence HTTP packet.

The NAL unit fragment correspondence HTTP packets illustrated in FIGS. 16(b2) to 16(b4) are HTTP packets storing a NAL fragment (NALf) generated by dividing the NAL unit in the media data (mdat) region of the sub GOP media segment illustrated in FIG. 16(a). In other words, the NAL unit fragment correspondence HTTP packets illustrated in FIGS. 16(b2) to 16(b4) are a media data storage type NAL unit fragment correspondence HTTP packet.

Only one NAL unit is stored in the sub GOP media segment illustrated in FIG. 16(a), but there are cases in which one NAL unit is stored in the sub GOP media segment as illustrated in FIG. 16(a) and cases in which two or more NAL units are stored in the sub GOP media segment. The configuration data of the NAL unit fragment is not limited to one NAL unit and may be data including a plurality of NAL units. For example, a second half portion of a preceding NAL unit may be combined with a head portion of a subsequent NAL unit to set one NAL unit fragment.

The transmission apparatus 20 generates a plurality of HTTP packets by dividing one sub GOP media segment as described above, generates IP packets from the HTTP packets, and sequentially transmits the IP packets.

However, when one original NAL unit and the attribute information thereof are divided and delivered as described above, it is necessary to reconstruct the NAL unit and the attribute information thereof so that the reception apparatus 30 side performs the decoding process and the reproduction process.

Information necessary for this is recorded in the HTTP header as additional information.

The following additional information is recorded in the HTTP header of the metadata storage type NAL unit fragment correspondence HTTP packet illustrated in FIG. 16(b1):

a NAL unit fragment header [X-NALUFragmentSubSegmentHeader];

a movie fragment sequence number [X-MovieFragmentSequenceNumber]; and access point information [X-SAP].

The NAL unit fragment header is identification information for identifying whether the HTTP packet is the metadata storage type NAL unit fragment correspondence HTTP packet or the media data storage type NAL unit fragment correspondence HTTP packet.

The movie fragment sequence number is the sequence number recorded in the metadata (moof) of the sub GOP media segment before the division, and serves as arrangement information of the NAL units stored in the sub GOP media segment. As the sequence number, the sequence number recorded in the metadata (moof) of the sub GOP media segment before the division is copied without change and recorded.

The access point information is information indicating whether or not the data serving as the random access point is included in the NAL unit stored in the sub GOP segment (the sub GOP media segment of FIG. 16(a)) serving as the generation source of the HTTP packet.

The reception apparatus can immediately determine whether or not the HTTP packet is data generated based on the configuration data of the sub GOP segment including the NAL unit serving as the random access point with reference to the access point information (X-SAP).

When the access point information (X-SAP) recorded in the HTTP header of the metadata storage type NAL unit fragment correspondence HTTP packet of FIG. 16(b1) indicates that the access point data is included in the sub GOP segment of the packet generation source, it is possible to acquire the SAP, that is, the position of the encoded data of the random access point with reference to the metadata [sidx].

Meanwhile, the following additional information is recorded in the HTTP header of the media data storage type NAL unit fragment correspondence HTTP packets illustrated in FIGS. 16(b2) to 16(b4).

a movie fragment sequence number [X-MovieFragmentSequenceNumber];

in-NAL unit position identification information [X-NALUFragmentIndicator]; and access point information [X-SAP].

The movie fragment sequence number is the sequence number recorded in the metadata (moof) of the sub GOP media segment before the division, and serves as the arrangement information of the NAL units stored in the sub GOP media segment as described above. As the sequence number, the sequence number recorded in the metadata (moof) of the sub GOP media segment before the division is copied without change and recorded.

The in-NAL unit position identification information is information indicating a position of the NAL unit before the division to which the NAL unit fragment (NALf) stored in the packet corresponds.

A packet in which the in-NAL unit position identification information is X-StartNALUFragmentSubSegment is a packet in which the NAL unit fragment (NALf) in the head region of the NAL unit before the division is stored as the media data (mdat).

A packet in which the in-NAL unit position identification information is X-MiddleNALUFragmentSubSegment is a packet in which the NAL unit fragment (NALf) in the intermediate region of the NAL unit before the division is stored as the media data (mdat).

A packet in which the in-NAL unit position identification information is X-EndNALUFragmentSubSegment is a packet in which the NAL unit fragment (NALf) in the tail region of the NAL unit before the division is stored as the media data (mdat).

When the NAL unit stored in one sub GOP media segment is divided into four or more media data storage type NAL unit fragment correspondence HTTP packets, a plurality of packets to which the in-NAL unit position identification information=X-MiddleNALUFragmentSubSegment is set are generated. An arrangement of the NAL unit fragments (NALf) of the media data (mdat) stored in the packets can be determined based on the packet header information other than the HTTP header.

For example, the arrangement of the NAL unit fragments (NALf) of the media data (mdat) stored in the packets can be determined with reference to the packet sequence number recorded in the LCT header of the LCT packet storing the HTTP packet. A specific configuration of the transmission packet and a specific configuration of the LCT header will be described later.

Thus, for example, in the configuration of storing the HTTP packet in the LCT packet and transmitting the resulting LCT packet, the in-NAL unit position identification information set to the HTTP header may be set to identify only a packet storing data in which the position is the head region. In other words, only the in-NAL unit position identification information=X-StartNALUFragmentSubSegment may be recorded, and data subsequent thereto may be arranged with reference to the sequence number of the LCT header.

The access point information is information indicating whether or not the data serving as the random access point is included in the NAL unit stored in the sub GOP segment (the sub GOP media segment of FIG. 16(a)) serving as the generation source of the HTTP packet.

The reception apparatus can immediately determine whether or not the HTTP packet is the data generated based on the configuration data of the sub GOP segment including the NAL unit serving as the random access point with reference to the access point information (X-SAP).

Figure 17:
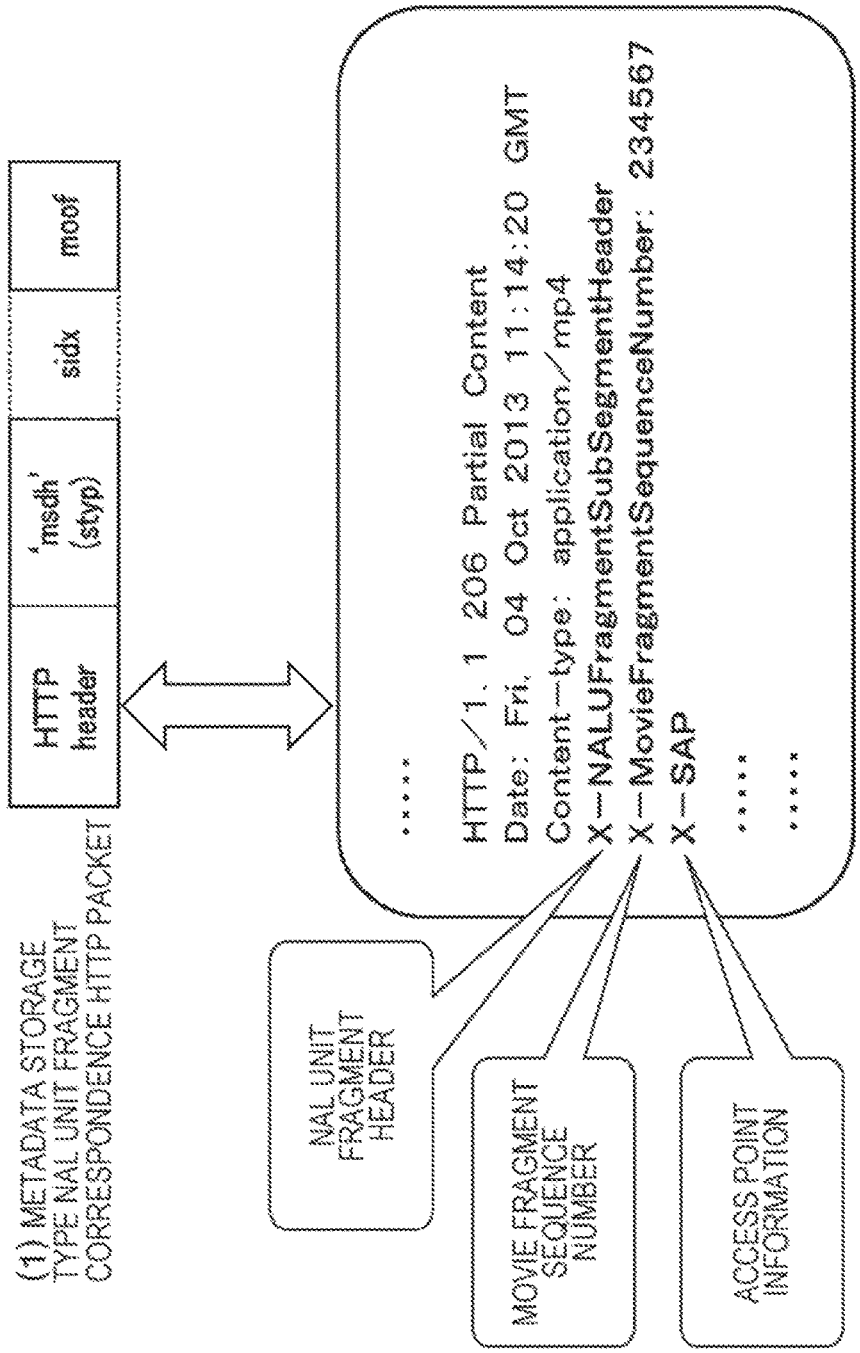
FIG. 17 is a diagram for describing additional information recorded in a HTTP header of a metadata storage type NAL unit fragment correspondence HTTP packet.

FIG. 17 illustrates a configuration of the metadata storage type NAL unit fragment correspondence HTTP packet and an exemplary data configuration of the HTTP header.

As illustrated in FIG. 17, for example, the following HTTP header information is recorded in the HTTP header:

```
"...
HTTP/1.1 206 Partial Content
Date: Fri, 04 Oct 2013 11:14:20 GMT
Content-type: application/mp4
X-NALUFragmentSubSegmentHeader
X-MovieFragmentSequenceNumber: 234567
X-SAP
..."
```

In the HTTP header information,
the NAL unit fragment header is
"X-NALUFragmentSubSegmentHeader."

The NAL unit fragment header is recorded as information indicating that the HTTP packet is the metadata storage type NAL unit fragment correspondence HTTP packet.

In the HTTP header information,
the movie fragment sequence number is
"X-MovieFragmentSequenceNumber."

The movie fragment sequence number is the sequence number recorded in the metadata (moof) of the sub GOP media segment before the division, and serves as the arrangement information of the NAL units stored in the sub GOP media segment as described above As the sequence number. This sequence number recorded in the metadata (moof) of the sub GOP media segment before the division is copied without change and recorded.

In the HTTP header information, the access point information is "X-SAP."

The access point information is information indicating whether or not the data serving as the random access point is included in the NAL unit stored in the sub GOP segment serving as the generation source of the HTTP packet.

Next, a configuration of the media data storage type NAL unit fragment correspondence HTTP packet storing the media data and an exemplary data configuration of the HTTP header will be described with reference to FIG. 18.

Figure 18:
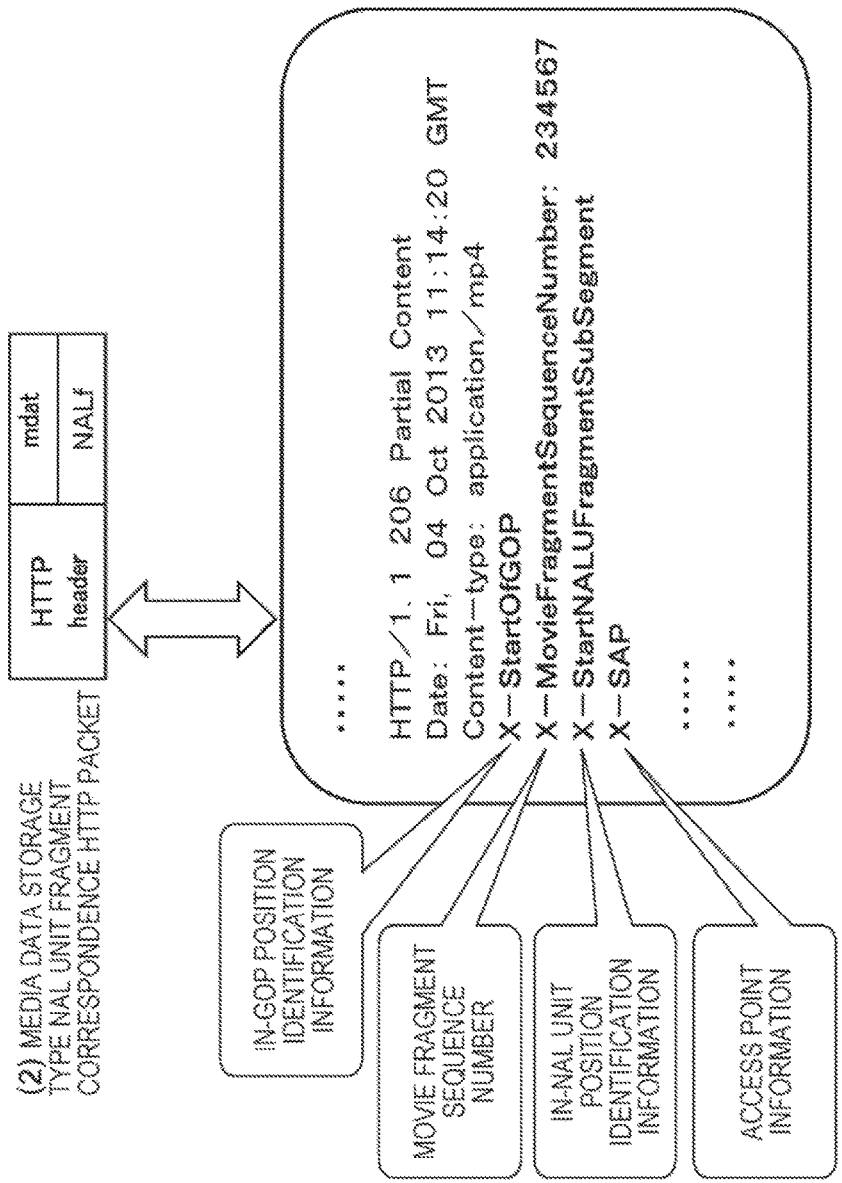
FIG. 18 is a diagram for describing additional information recorded in a HTTP header of a media data storage type NAL unit fragment correspondence HTTP packet.

As illustrated in FIG. 18, for example, the following HTTP header information is recorded in the HTTP header.

```
"...
HTTP/1.1 206 Partial Content
Date: Fri, 04 Oct 2013 11:14:20 GMT
Content-type: application/mp4
X-StartOfGOP
X-MovieFragmentSequenceNumber: 234567
X-StartNALUFragmentSubSegment
X-SAP
..."
```

In the HTTP header information,
the in-GOP position identification information is
"X-StartOfGOP."

The in-GOP position identification information is data indicating a position in one GOP at which the media data (mdat) stored in the HTTP packet is located.

Any one of the following data is recorded in the HTTP header as the in-GOP position identification information:

"X-StartOfGOP" when the media data (mdat) stored in the HTTP packet is in the head region of one GOP;

"X-MiddleOfGOP" when the media data (mdat) stored in the HTTP packet is in the intermediate region of one GOP; and "X-EndOfGOP" when the media data (mdat) stored in the HTTP packet is in the tail region of one GOP.

In the HTTP header information,
the movie fragment sequence number is
"X-MovieFragmentSequenceNumber."

The movie fragment sequence number is the sequence number recorded in the metadata (moof) of the sub GOP media segment before the division, and serves as the arrangement information of the NAL units stored in the sub GOP media segment as described above. As the sequence number, the sequence number recorded in the metadata (moof) of the sub GOP media segment before the division is copied without change and recorded.

In the HTTP header information,
the in-NAL unit position identification information is
"X-StartNALUFragmentSubSegment."

The in-NAL unit position identification information is information indicating a position of the NAL unit before the division to which the NAL unit fragment (NALf) stored in the packet corresponds.

A packet in which the in-NAL unit position identification information is X-StartNALUFragmentSubSegment is a packet in which the NAL unit fragment (NALf) in the head region of the NAL unit before the division is stored as the media data (mdat).

A packet in which the in-NAL unit position identification information is X-MiddleNALUFragmentSubSegment is a packet in which the NAL unit fragment (NALf) in the intermediate region of the NAL unit before the division is stored as the media data (mdat).

A packet in which the in-NAL unit position identification information is X-EndNALUFragmentSubSegment is a packet in which the NAL unit fragment (NALf) in the tail region of the NAL unit before the division is stored as the media data (mdat).

In the HTTP header information, the access point information is "X-SAP."

The access point information is information indicating whether or not the data serving as the random access point is included in the NAL unit stored in the sub GOP segment serving as the generation source of the HTTP packet.

9. Process Sequences of Transmission Apparatus and the Reception Apparatus

Next, process sequences performed by the transmission apparatus and the reception apparatus will be described with reference to flowcharts illustrated in FIGS. 19 and 20.

First, a process sequence performed by the transmission apparatus 20 will be described with reference to a flowchart illustrated in FIG. 19.

Figure 19:
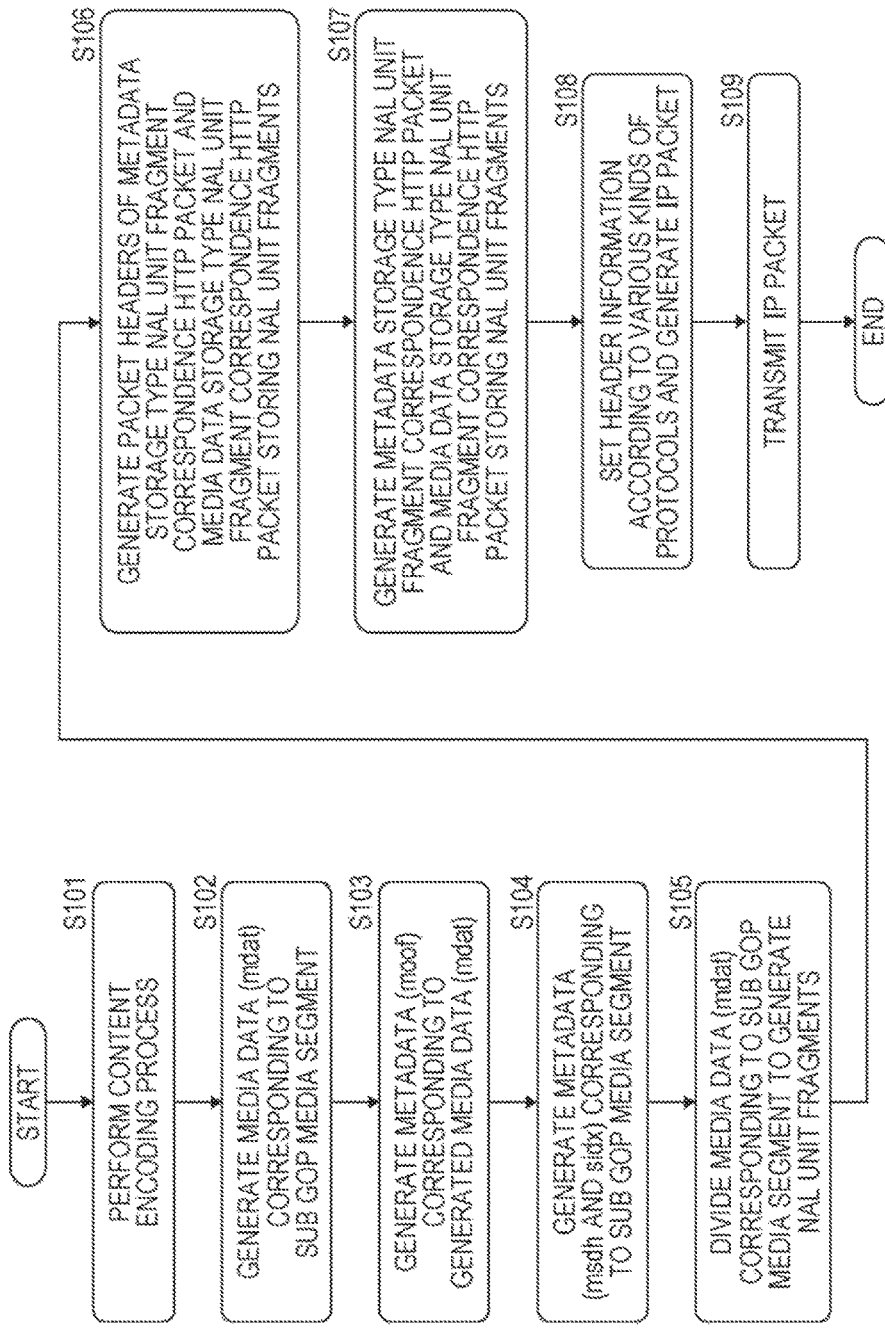
FIG. 19 is a diagram illustrating a flowchart for describing a process sequence executed by a transmission apparatus.
Figure 20:
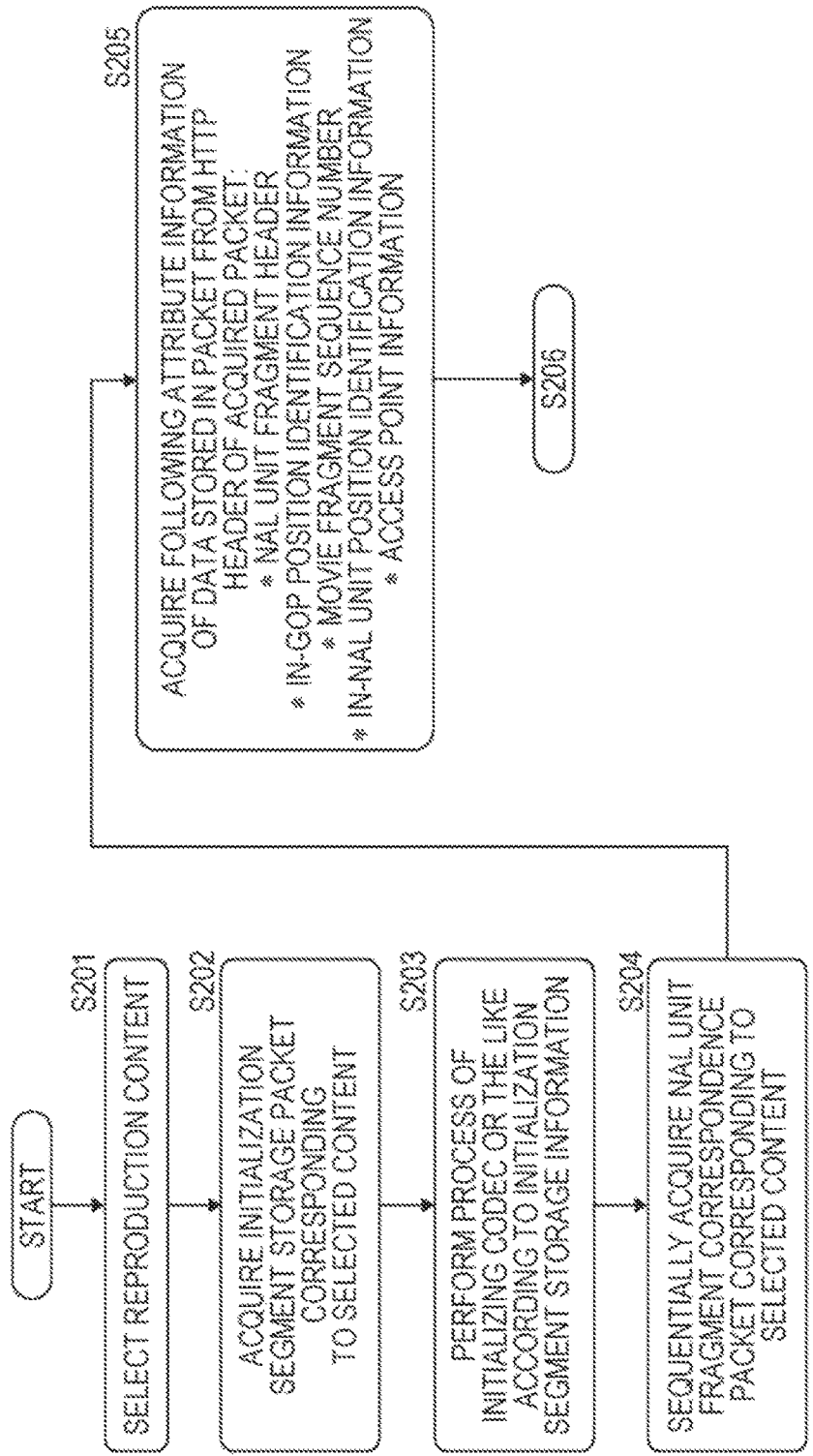
FIG. 20 is a diagram illustrating a flowchart for describing a process sequence executed by a reception apparatus.

The flow illustrated in FIG. 19 is the flow for describing a process of generating and transmitting the metadata storage type NAL unit fragment correspondence HTTP packet generated based on the sub GOP media segment or the media data storage type NAL unit fragment correspondence HTTP packet illustrated in FIG. 16(*a*), for example, described above with reference to FIG. 16.

This process is performed by the data processing unit of the transmission apparatus 20. The data processing unit includes a CPU having a program execution function, and performs the process according to the flow illustrated in FIG. 19 according to a program stored in a storage unit.

Hereinafter, processes of respective steps will be sequentially described.

(Step S101)

First, the data processing unit of the transmission apparatus performs the encoding process on content serving as a transmission target. For example, the encoding process according to the MP4 file format is performed.

(Step S102)

Then, the transmission apparatus generates the media data (mdat) corresponding to the sub GOP media segment. This process is a process of generating the media data (mdat) stored in the sub GOP media segment described above with reference to the drawings including FIG. 5. The media data (mdat) including a part of the GOP data serving as MP4 encoded data, that is one or more NAL units configuring the GOP as the configuration data is generated.

(Step S103)

Then, the transmission apparatus generates the metadata (moof) serving as the attribute information corresponding to the media data (mdat) generated in step S102.

(Step S104)

Then, the transmission apparatus generates msdh and sidx serving as the metadata corresponding to the sub GOP media segment. msdh and sidx are the metadata stored in the sub GOP media segment described above with reference to the drawings including FIG. 5.

(Step S105)

Next, the transmission apparatus divides the metadata (mdat) for storing sub GOP media segments to generate a NAL unit fragment (NALf). The division process is performed so that the payload of a MAC frame is approximately 1,500 bytes or less according to a general MTU of the MAC frame, for example.

(Step S106)

Next, the transmission apparatus generates the packet headers of a metadata storage type NAL unit fragment correspondence HTTP packet and a media data storage type NAL unit fragment correspondence HTTP packet storing NAL unit fragments.

This is the HTTP header information generation process described above with reference to FIGS. 16, 17, and 18.

The following information is recorded in the HTTP header of the metadata storage type NAL unit fragment correspondence HTTP packet.

First, a NAL unit fragment header indicating that the HTTP packet is the metadata storage type NAL unit fragment correspondence HTTP packet is recorded.

Further, the movie fragment sequence number corresponding to the arrangement information of the NAL units stored in the sub GOP media segment is recorded. As the sequence number, the sequence number recorded in the metadata (moof) of the sub GOP media segment before the division is copied without change and recorded.

Further, the access point information "X-SAP" is recorded.

The access point information is information indicating whether or not the data serving as the random access point is included in the NAL unit stored in the sub GOP segment serving as the generation source of the HTTP packet.

Meanwhile, the following information is recorded in the packet header of the media data storage type NAL unit fragment correspondence HTTP packet.

The in-GOP position identification information is data indicating a position in one GOP at which the media data (mdat) stored in the HTTP packet is located.

Any one of the following data is recorded in the HTTP header as the in-GOP position identification information:

"X-StartOfGOP" when the media data (mdat) stored in the HTTP packet is in the head region of one GOP;

"X-MiddleOfGOP" when the media data (mdat) stored in the HTTP packet is in the intermediate region of one GOP; and "X-EndOfGOP" when the media data (mdat) stored in the HTTP packet is in the tail region of one GOP.

The movie fragment sequence number is the sequence number recorded in the metadata (moof) of the sub GOP media segment before the division, and serves as arrangement information of the NAL units stored in the sub GOP media segment. As the sequence number, the sequence number recorded in the metadata (moof) of the sub GOP media segment before the division is copied without change and recorded.

The in-NAL unit position identification information is information indicating a position of the NAL unit before the division to which the NAL unit fragment (NALf) stored in the packet corresponds.

The access point information "X-SAP": the access point information is information indicating whether or not the data serving as the random access point is included in the NAL unit stored in the sub GOP segment serving as the generation source of the HTTP packet.

In step S106, the transmission apparatus generates the packet headers of the metadata storage type NAL unit fragment correspondence HTTP packet and the media data storage type NAL unit fragment correspondence HTTP packet storing NAL unit fragments in the above-described manner.

(Step S107)

Next, in step S107, the transmission apparatus generates the following HTTTP packets to which the HTTP header generated in step S106 is set:

Metadata storage type NAL unit fragment correspondence HTTP packet; and

Media data storage type NAL unit fragment correspondence HTTP packet.

(Steps S108 and S109)

Then, the transmission apparatus generates an IP packet by setting the LCT header, the UDP header, and the IP header to the generated HTTP packet, and transmits the IP packet. The transmission process is performed through either of the communication network such as the Internet and the broadcast wave or both communication paths.

The flow illustrated in FIG. 19 is the flow for describing the generation/transmission process of the packet generated based on the media segment. When the packet is generated based on the initialization segment, after the configuration data of the initialization segment is generated, for example, the process of recording the segment identifier indicating the initialization segment in the HTTP header is performed.

Figure 21:
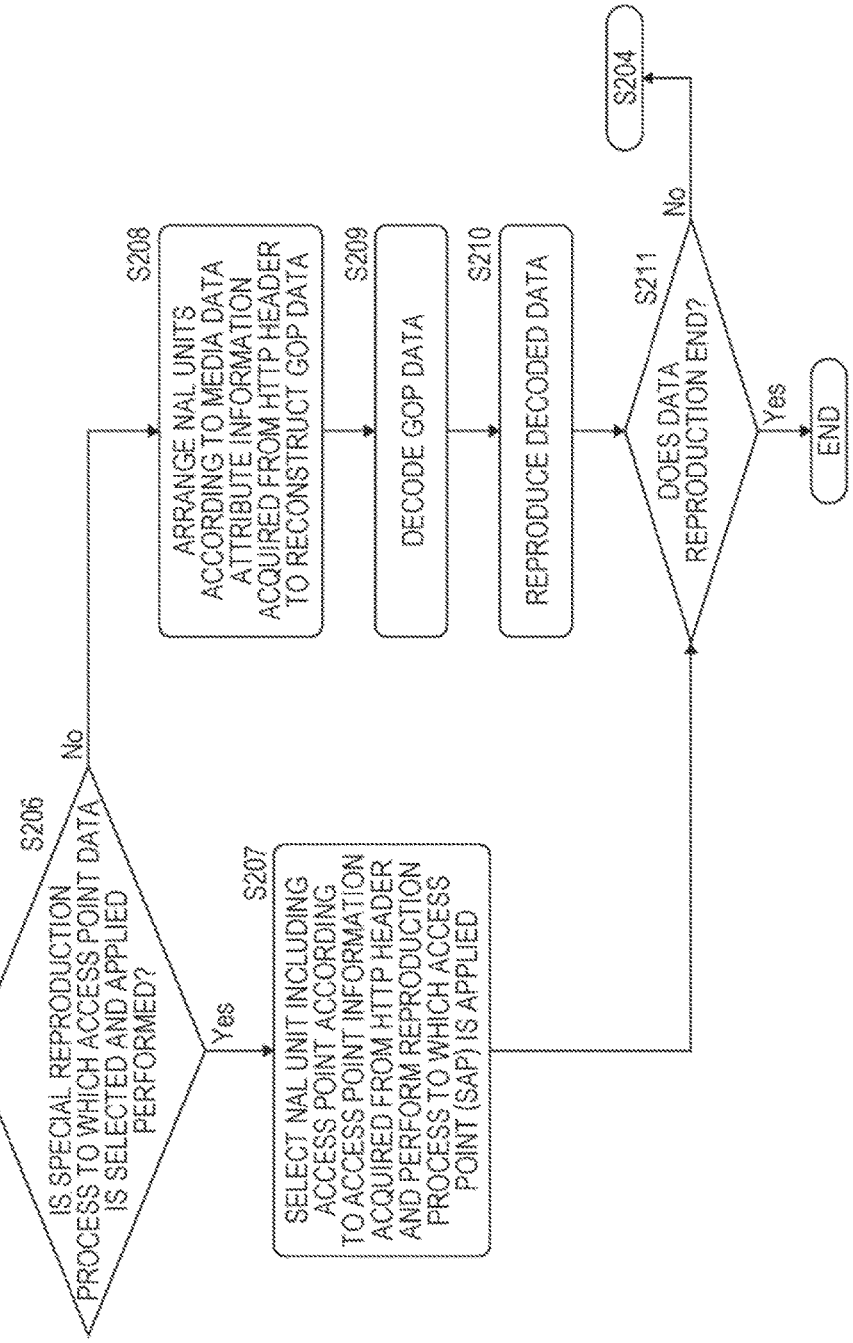
FIG. 21 is a diagram illustrating a flowchart for describing a process sequence executed by a reception apparatus.

Next, a process sequence from packet reception to content reproduction which is performed in the reception apparatus will be described with reference to flowcharts illustrated in FIGS. 20 and 21.

This process is performed by the data processing unit of the reception apparatus 30. The data processing unit includes a CPU having a program execution function, and performs the process according to the flow illustrated in FIGS. 20 and 21 according to a program stored in a storage unit.

Hereinafter, processes of respective steps will be sequentially described.

(Step S201)

First, in step S201, the reception apparatus receives information designating reproduction content from the user. For example, a content list such as a program table previously received from the transmission apparatus is displayed on the display unit, and reproduction content is decided based on user input information on the display information.

(Step S202)

Then, the reception apparatus receives a packet including the initialization segment corresponding to selected content selected as a reproduction target, and acquires the initialization segment.

As described above with reference to FIG. 9, the segment identification information is recorded in the HTTP header of the HTTP packet in which the initialization segment is stored, and thus it is possible to check the HTTP packet in which the initialization segment is stored with reference to the identification information.

(Step S203)

The reception apparatus performs a process of initializing the reception apparatus according to the storage data of the received initialization segment. Specifically, the reception apparatus acquires a codec setting parameter stored in the initialization segment, and performs, for example, a codec setting according to the acquired parameter.

(Step S204)

Next, the reception apparatus receives the following packets which are the divisional packets of the sub GOP media segment corresponding to the selected content selected in step S201:

IP packet storing the metadata storage type NAL unit fragment correspondence HTTP packet; and IP packet storing the media data storage type NAL unit fragment correspondence HTTP packet.

(Step S205)

Then, the reception apparatus acquires the following attribute information of data stored in the packet from the HTTP header of the received packet:

the NAL unit fragment header;

the in-GOP position identification information;

the movie fragment sequence number;

in-NAL unit position identification information; and the access point information.

As described above, the NAL unit fragment header is information indicating that the HTTP packet is the metadata storage type NAL unit fragment correspondence HTTP packet.

The in-GOP position identification information is data indicating a position in one GOP at which the media data (mdat) stored in the HTTP packet is located.

The movie fragment sequence number is the sequence number recorded in the metadata (moof) of the sub GOP media segment before the division, and serves as arrangement information of the NAL units stored in the sub GOP media segment.

The in-NAL unit position identification information is information indicating a position of the NAL unit before the division to which the NAL unit fragment (NALf) stored in the packet corresponds.

The access point information "X-SAP" is information indicating whether or not the data serving as the random access point is included in the NAL unit stored in the sub GOP segment serving as the generation source of the HTTP packet.

(Step S206)

Then, in step S206, the reception apparatus determines whether or not the special reproduction in which the access point data is to be decoded and reproduced preferentially is performed.

For example, it is determined whether or not a special reproduction process such as a reproduction process from the middle of content such as a random access reproduction process is performed. This determination process is decided based on input information of the user or the like.

When the special reproduction process is to be performed, the process proceeds to step S207. When the normal reproduction process is to be performed, the process proceeds to step S208.

(Step S207)

When the special reproduction process such as the random access reproduction process is determined to be performed in step S206, the process proceeds to step S207. In step S207, a packet in which the access point information [X-SAP] recorded in the HTTP header of the packet indicates data having the access point is selected. In other words, the packet indicating that the data serving as the random access point is included in the NAL unit stored in the sub GOP segment serving as the generation source of the HTTP packet is selected as a decoding target, and the decoding process and the reproduction process are performed.

In this case, the decoding process and the reproduction can be performed without arranging all the GOPs.

After the process of step S207, the process proceeds to step S211.

(Step S208)

On the other hand, when it is determined in step S206 that the special reproduction process such as a random access reproduction process is not to be performed but a normal reproduction process is to be performed, the process proceeds to step S208. In step S208, the reception apparatus rearranges the NAL unit fragments stored in a plurality of received media data storage type NAL unit fragment correspondence HTTP packets according to the identification information acquired from the HTTP header, and reconstructs the GOP unit data.

(Steps S209 and S210)

Then, the reception apparatus performs the decoding process on the reconstructed GOP data, and performs the reproduction process on the decoded data.

(Step S211)

Then, the reception apparatus determines whether or not the data reproduction process ends, and when the data reproduction process does not end, the process returns to step S204, and step S204 and the process subsequent thereto are repeatedly performed.

When the reproduction process is determined to end in step S211, the process ends.

Further, for example, when only an image at a specific reproduction position is reproduced as in random access reproduction or the like, the process can be performed using one or more NAL unit fragments (NALf) calculated from sidx data as the processing target with reference to sidx data serving as the random access point information in the metadata storage type NAL unit fragment correspondence HTTP packet. In other words, for example, a process of selecting, decoding, and reproducing only encoded image data corresponding to the I picture is performed.

In this case, it is possible to select and reproduce only the data of the random access point without performing the process of rearranging all data of the GOP.

10. Embodiment in which Additional Information is Recorded in Extension Header In the above embodiment, the additional information for smoothly executing a process at the reception apparatus side such as the arrangement information of the NAL unit fragments (NALf), the information applied to the GOP reconfiguration process, and the access point information is set in the HTTP packet.

However, the record destination of the additional information is not limited to the HTTP header, and various record destinations can be set.

An embodiment in which the additional information is recorded in the extension header will be described below.

An embodiment in which the additional information is recorded in the extension header will be described with reference to FIGS. 22 and 23.

An example illustrated in FIGS. 22 and 23 is an example in which a new extension header is inserted into a packet region subsequent to the HTTP header, and the additional information is recorded in the extension header.

FIG. 22 illustrates a list of the additional information recorded in the extension header, and FIG. 23 illustrates examples of three types of HTTP packets having the extension header.

FIG. 23 illustrates the following three types of HTTP packets:

(1) an initialization segment HTTP packet;
(2) a media segment based metadata storage type NAL unit fragment correspondence HTTP packet; and
(3) a media segment based media data storage type NAL unit fragment correspondence HTTP packet.

The extension header is set after the HTTP header of each packet.

The additional information according to the list illustrated in FIG. 22 is recorded in the extension header. An example of the additional information to be recorded will be described with reference to FIG. 22. As illustrated in FIG. 22, the additional information is configured with the following information:

(a) the segment identification information (Initialization Segment Identifier);
(b) the in-GOP position identification information (Sub GOP Indicator);
(c) the movie fragment sequence number (Movie Fragment Sequence Number);
(d) the NAL unit fragment header (NALU Fragment Sub Segment Header);
(e) the in-NAL unit position identification information (NALU Fragment Identifier); and
(f) the access point information (SAPIndicator).

For example, (a) the segment identification information is 8-bit data and 1 is set in the case of the initialization segment, and 0 is set in the case of the other segments.

In the case of the media segment, when the content position information (ContentLocation) recorded in the HTTP header is set as position information of the GOP unit data, it is possible to distinguish each GOP data with reference to the content position information.

(b) The in-GOP position identification information is 8-bit data, and, for example, a bit value thereof is set as follows:
data (StartofGOP) at the head position of the GOP=1;
Data (MiddleofGOP) at the intermediate position of the GOP=2; and
Data (EndofGOP) at the tail position of the GOP=3.

(c) The movie fragment sequence number is 32-bit data, and the sequence number recorded in the metadata (moof) of the sub GOP media segment before the division is recorded. The movie fragment sequence number is the arrangement information of the NAL units stored in the sub GOP media segment.

(d) The NAL unit fragment header is 8-bit data, and 1 is recorded in the case of the metadata storage type NAL unit fragment correspondence packet, and 0 is recorded in the case of the other packets.

(e) The in-NAL unit position identification information is 8-bit data, and information indicating a position of the NAL unit before the division to which the NAL unit fragment (NALf) stored in the packet corresponds. Bit values are set and recorded as follows:
the head position of the NAL unit before the division (StarNALUnitFragmentSubSegment)=1;
the intermediate position of the NAL unit before the division (MiddleNALUnitFragmentSubSegment)=2; and
the tail position of the NAL unit before the division (EndNALUnitFragmentSubSegment)=3.

(f) The access point information (SAPIndicator) is the same data as [X-SAP] described as the record information of the HTTP header, and 8-bit data is used. [1] is recorded when the packet is the packet generated from the NAL unit storage segment including the access point, and [0] is recorded when it is the other packets.

FIG. 23 illustrates an example in which the respective additional information of (a) to (f) illustrated in FIG. 22 is set to the extension headers of the following three types of HTTP packets:
(1) the initialization segment HTTP packet;
(2) the media segment based metadata storage type NAL unit fragment correspondence HTTP packet; and
(3) the media segment based media data storage type NAL unit fragment correspondence HTTP packet.

The transmission apparatus sets the extension header, and transmits the set extension header to the reception apparatus. The reception apparatus determines which of the HTTP packet storing the initialization segment, the metadata storage type NAL unit fragment correspondence HTTP packet, or the media data storage type NAL unit fragment correspondence HTTP packet is the segment stored in the packet with reference to the segment identification information of the extension header.

Further, when the packet is determined to be the media data storage type NAL unit fragment correspondence HTTP packet, the reception apparatus can rearrange the NAL unit fragments (NALf) and reconstruct the GOP with reference to the in-GOP position identification information or the in-NAL unit position identification information of the extension header.

Further, it is possible to determine whether or not the packet is the packet generated from the NAL unit storage segment including the access point with reference to the access point information (SAPIndicator).

11. Embodiment in which Additional Information is Recorded in LCT Header

As described above, examples of the transport protocol applicable to the multicast/broadcast (MC/BC) type streaming include the RTP (Real-time Transport Protocol) protocol and the FLUTE (File Delivery over Uni-directional Transport) protocol.

An LCT header serving as header information according to the FLUTE protocol is set to a packet set according to the FLUTE protocol.

In other words, the LCT header is the LCT header in the IP packet described above with reference to FIG. 10.

Next, an embodiment in which the additional information for smoothly executing a process at the reception apparatus side such as the information applied to the rearrangement of the NAL unit fragments (NALf) and the GOP reconfiguration process is recorded in the LCT header will be described.

FIG. 24 illustrates an exemplary configuration of the LCT header set according to the FLUTE protocol.

For example, the following main data fields are set to the LCT header:

CCI (Congestion Control Information): a field in which a length of each field, congestion control information, and the like are recorded;

TSI (Transport Session Identifier): a field in which packet transport session information is recorded;

TOI (Transport Object Identifier): a field in which a packet transport sequence or the like is recorded; and header extension portion (Header Extensions): a field in which various extension data can be recorded.

As described above with reference to FIG. 7, it is possible to check the data transmission order with reference to the TOI instead of the in-GOP position information.

As described above, for example, only X-StartofGOP indicating the head position may be recorded for the in-GOP position information serving as the additional information recorded in the HTTP header or the like, the packet sequence may be acquired as the arrangement order of data in the other GOPs with reference to the TOI in the LCT header, and the NAL units in the GOP may be arranged in the correct order according to the packet sequence.

Similarly, it is possible to check the data transmission order and perform the rearrangement with reference to TOI as the arrangement information of the NAL unit fragments (NALf). For example, the in-NAL unit position identification information serving as the additional information recorded in the HTTP header or the like is recorded in the HTTP header for only the packet storing the NAL unit fragment of the head position. It is possible to analyze the packet sequence from the TOI of the LCT header and arrange the subsequent NAL unit fragments.

As illustrated in FIG. 24, the header extension portion (Header Extensions) in which various data can be recorded is set to the LCT header. The additional information for smoothly executing a process at the reception apparatus side such as the information applied to the rearrangement of the NAL unit fragment and the GOP reconfiguration process can be recorded in the header extension portion.

A data record configuration of the header extension portion of the LCT header will be described with reference to FIG. 25.

There are two types of formats when data is recorded in the header extension portion of the LCT header.

FIG. 25(1) illustrates a format in which the length of the record information can be freely set.

FIG. 25(2) illustrates a format in which the length of the record information is fixed.

Extension header identification information (a numerical value) indicating a type of extension header is recorded in HET (Header Extension Type). It is specified that the format of FIG. 25(1) can use values of up to 127, and the format of FIG. 25(2) can use values of 128 or more.

The length of the extension header is record in HET (Header Extension Length).

HEC (Neader Extension Content) is a field in which extension header content is recorded, and arbitrary extension information can be recorded.

FIG. 26 illustrates an exemplary configuration of record data when the additional information for smoothly executing a process at the reception apparatus side such as the information applied to the rearrangement of the NAL unit fragments and the GOP reconfiguration process is recorded using the format of FIG. 25(2) in which the length of the record information is fixed.

As illustrated in FIG. 26, (a) the extension header identification information (HET) is 8-bit data, and, for example, [200] is recorded as an identification value of new information.

The following identification information is recorded in the extension information record portion (HEC):
  (b) the segment identification information;
  (c) the in-GOP position identification information;
  (d) the movie fragment sequence number;
  (e) the NAL unit fragment header;
  (f) the in-NAL unit position identification information; and
  (g) the access point information.

For example, (b) the segment identification information is 8-bit data, and 1 is set in the case of the initialization segment, and 0 is set in the case of the other segments.

In the case of the media segment, when the content position information (ContentLocation) recorded in the HTTP header is set as position information of the GOP unit data, it is possible to distinguish each GOP data with reference to the content position information.

(c) The in-GOP position identification information is 8-bit data, and, for example, a bit value thereof is set as follows:
  data (StartofGOP) at the head position of the GOP=1;
  Data (MiddleofGOP) at the intermediate position of the GOP=2; and
  Data (EndofGOP) at the tail position of the GOP=3.

(d) The movie fragment sequence number is 32-bit data, and the sequence number recorded in the metadata (moof) of the sub GOP media segment before the division is recorded. The movie fragment sequence number is the arrangement information of the NAL units stored in the sub GOP media segment.

(e) The NAL unit fragment header is 8-bit data, and 1 is recorded in the case of the metadata storage type NAL unit fragment correspondence packet, and 0 is recorded in the case of the other packets.

(f) The in-NAL unit position identification information is 8-bit data, and information indicating a position of the NAL unit before the division to which the NAL unit fragment (NALf) stored in the packet corresponds. Bit values are set and recorded as follows:
  the head position of the NAL unit before the division (StarNALUnitFragmentSubSegment)=1;
  the intermediate position of the NAL unit before the division (MiddleNALUnitFragmentSubSegment)=2; and
  the tail position of the NAL unit before the division (EndNALUnitFragmentSubSegment)=3.

(g) The access point information (SAPIndicator) is the same data as [X-SAP] described as the record information of the HTTP header, and 8-bit data is used. [1] is recorded when the packet is the packet generated from the NAL unit storage segment including the access point, and [0] is recorded when it is the other packets.

The transmission apparatus sets the LCT header including the extension header information, and transmits the set LCT header to the reception apparatus. The reception apparatus determines which of the initialization segment storage packet, the metadata storage type NAL unit fragment correspondence packet, and the media data storage type NAL unit fragment correspondence packet is the received packet with reference to the segment identification information of the extension header information in the LCT header. Further, when the packet is identified to be the media data storage type NAL unit fragment correspondence packet, the reception apparatus can perform the rearrangement of correctly arranging the NAL unit fragments (NALf) serving as the media data (mdat) stored in the respective packet and the reconfiguration of the GOP with reference to the in-NAL unit position identification information or the in-GOP position identification information recorded in the extension header information of the LCT header.

Further, it is possible to determine whether or not the packet is the packet generated from the NAL unit storage segment including the access point with reference to the access point information (SAPIndicator).

12. Application Example on HEVC Encoded Data

The above embodiment has been described in connection with the process example on the MP4 encoded data according to the MPEG coding scheme, but the process according to the present disclosure can be applied to any other encoded data. For example, the process according to the present disclosure can be applied to encoded data according to high efficiency video coding (HEVC).

A configuration of HEVC encoded data will be described with reference to FIG. 27.

Figure 27:
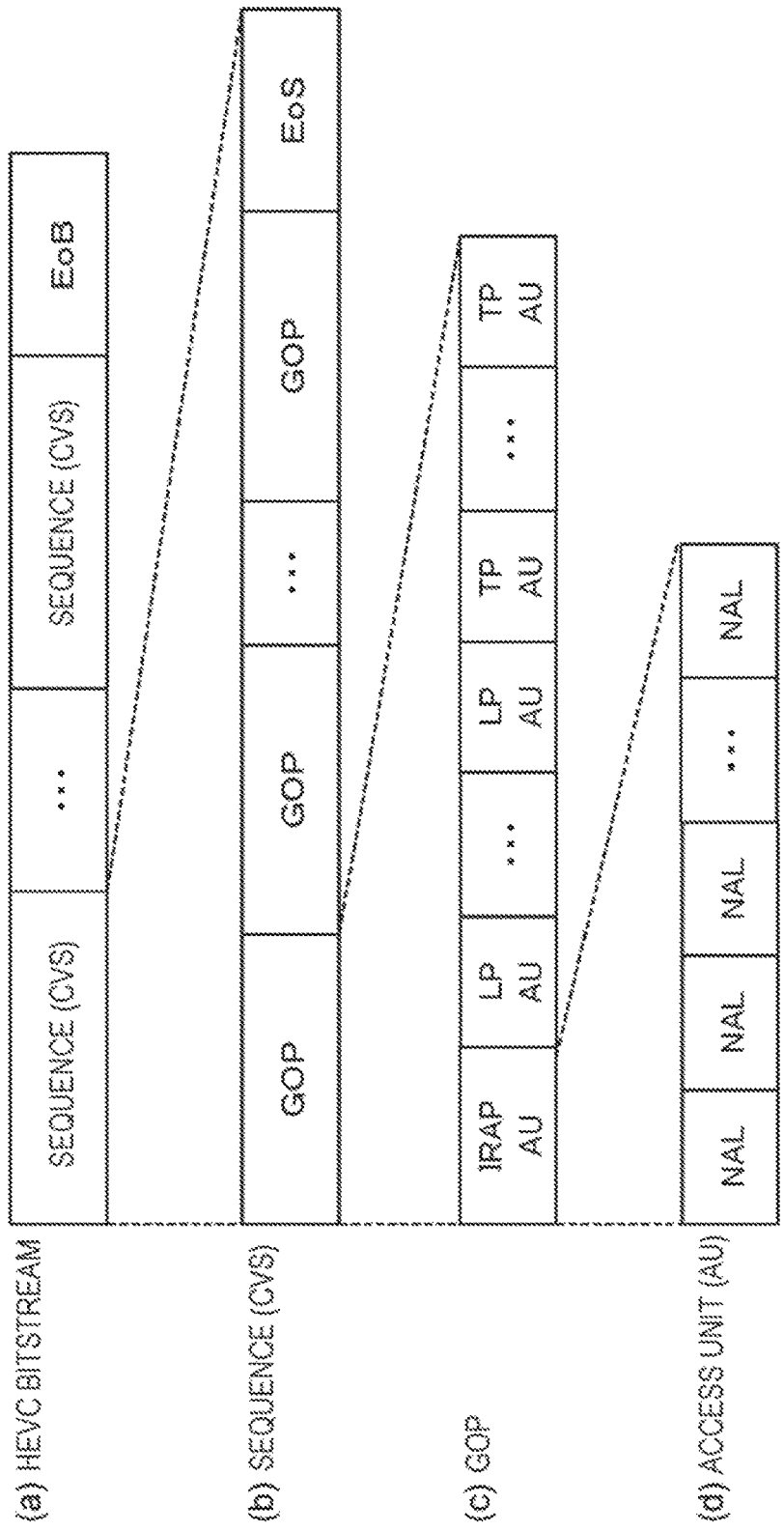
FIG. 27 is a diagram for describing a configuration of HEVC encoded data.

As illustrated in FIG. 27, one HEVC stream generated by a HEVC encoding process includes a plurality of sequences (coded video sequences (CVSs)) and an end of sequence NAL unit (EoB).

The CVS serving as an element of the HEVC stream is configured with a plurality of GOPs and an end of sequence NAL unit (EoS).

A GOP has an intra random access point (IRAP) access unit serving as the random access point as head data, and includes a plurality of leading picture (LP) access units and a plurality of trailing picture (TP) access units.

The LP access unit and the TP access unit are access units that can be decoded with reference to a certain reference picture.

However, when decoding starts from the IRAP access unit, normal decoding and reproduction can be performed even on the TPAU.

The access unit (AU) is configured with a plurality of network abstraction layer (NAL) units, and the access unit (AU) necessarily includes one or more slice segment NAL units.

As illustrated in FIG. 27, a GOP serving as an encoding processing unit is set even to the encoded data generated by the HEVC encoding process, and the GOP is further divided into a plurality of NAL units.

One or more NAL units serving as the configuration data of the GOP set in the HEVC encoded data are stored in the sub GOP media segment described above with reference to FIG. 5.

Further, as described above with reference to the drawings including FIG. 16, the NAL unit fragments (NALf) obtained by further dividing the NAL unit can be generated and stored in the HTTP packets in a distributed manner.

As described above, even for the packet storing the HEVC encoded data, the NAL unit fragments (NALf) obtained by further dividing the NAL unit serving as divisional data of the GOP data can be generated. Thus, the process described with reference to the drawings including FIG. 16 can be performed, and the process of the present disclosure can be applied.

The process of the present disclosure is not limited to the MP4 and the HEVC and can be applied to any encoding configuration in which an encoding processing unit corresponding to a GOP is provided, and units (NAL) obtained by dividing GOP data are set.

13. Exemplary Hardware Configurations of Respective Apparatuses

Finally, exemplary hardware configurations of the respective apparatuses that perform the above processes will be described with reference to FIG. 28.

Figure 28:
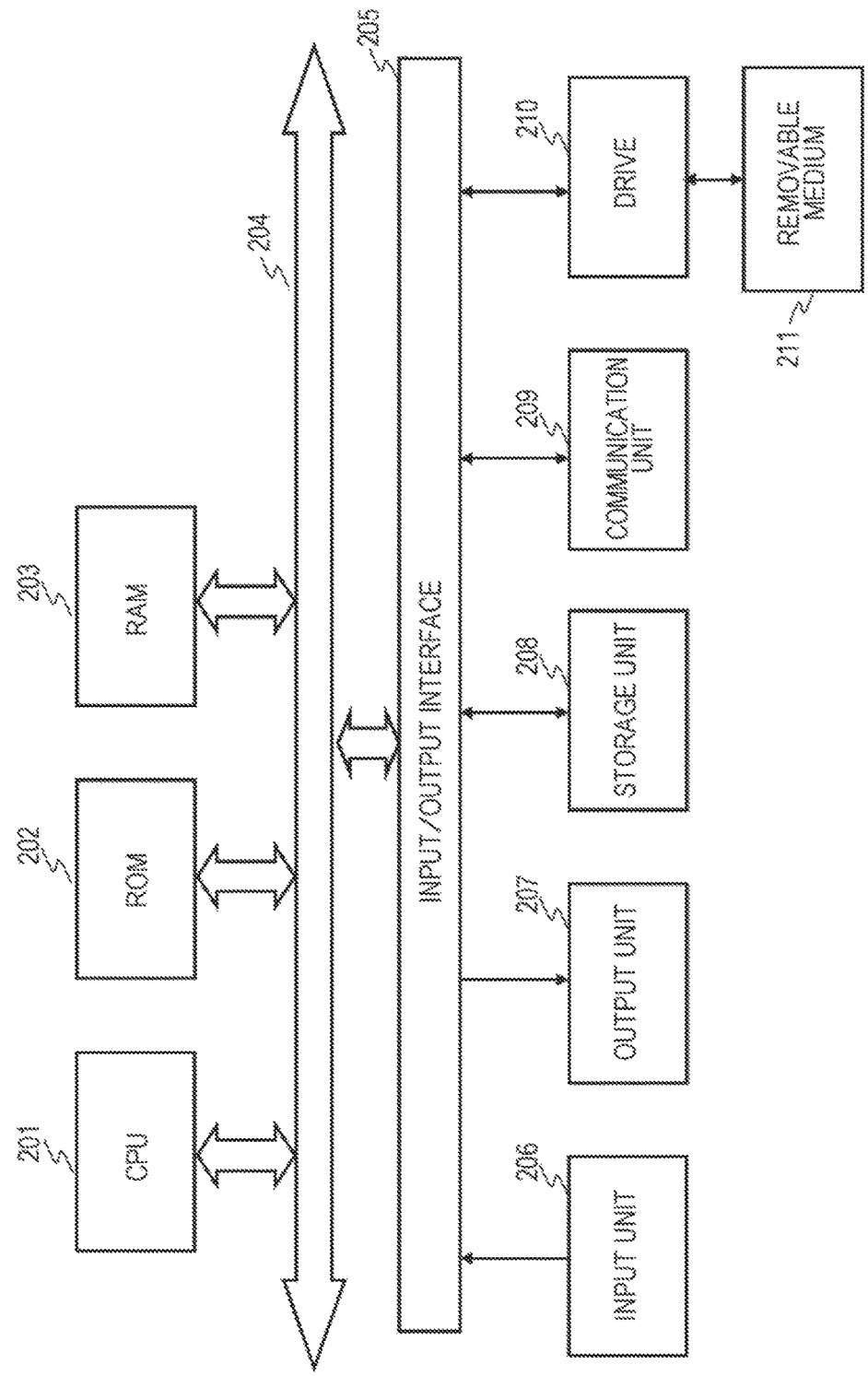
FIG. 28 is a diagram for describing an exemplary hardware configuration of a communication apparatus.

FIG. 28 illustrates an exemplary hardware configuration of a communication apparatus applicable as the transmission apparatus 20 and the reception apparatus 30.

A central processing unit (CPU) 201 functions as a data processing unit that performs various kinds of processes according to a program stored in a read only memory (ROM) 202 or a storage unit 208. For example, the CPU 201 performs the process according to the sequence described in the above embodiments. A program executed by the CPU 201, data, and the like are stored in a random access memory (RAM) 203. The CPU 201, the ROM 202, and the RAM 203 are connected to one another via a bus 204.

The CPU 201 is connected to an input/output interface 205 via the bus 204, and an input unit 206 including various kinds of switches, a keyboard, a mouse, a microphone, or the like and an output unit 207 including a display, a speaker, or the like are connected to the input/output interface 205. The CPU 201 performs various kinds of processes according to a command input from the input unit 206, and outputs a processing result to, for example, the output unit 207.

The storage unit 208 connected to the input/output interface 205 includes, for example, a hard disk or the like, and stores a program executed by the CPU 201 and various kinds of data. The communication unit 209 functions as a transceiving unit that transmits and receives data communication via a network such as the Internet or a local area network (LAN) and a transceiving unit that transmits and receives a broadcast wave, and performs communication with an external apparatus.

A drive 210 connected to the input/output interface 205 drives a removable medium 211 such as a magnetic disk, an optical disk, a magneto optical disk, or a semiconductor memory such as a memory card, and records or reads data.

Further, encoding or decoding of data can be performed as a process of the CPU 201 serving as a data processing unit, but a codec serving as dedicated hardware for performing an encoding process or a decoding process may be provided.

14. Conclusion of Configuration of Present Disclosure

The embodiments of the present disclosure have been described in detail with reference to specific examples. However, it is obvious that those having skill in the art can revise or substitute the embodiments within the scope not departing from the gist of the present disclosure. In other words, the present invention is disclosed in an exemplary form and not intended to be interpreted in a limited manner. In order to determine the gist of the present disclosure, claims set forth herein needs to be considered.

The technology disclosed in this specification may have the following configuration.

(1) A communication apparatus, including:
a data processing unit that generates a packet storing encoded data; and
a communication unit that transmits the packet generated by the data processing unit,
wherein the data processing unit generates a packet storing NAL units configuring a group of pictures (GOP) serving as a processing unit of encoded data or NAL unit fragments obtained by further dividing the NAL unit, and
the data processing unit generates a packet to which access point information indicating whether the NAL unit stored in the packet or a NAL unit serving as a division source of the NAL unit fragments includes data serving as a random access point is set as additional information for the packet, and transmits the generated packet through the communication unit.

(2) The communication apparatus according to (1), wherein the access point information is information indicating whether packet storage data is data generated based on a NAL unit that includes encoded data designated by a streaming access point (SAP).

(3) The communication apparatus according to (1) or (2), wherein the data processing unit generates media data including one or more NAL units serving as configuration data of the GOP and a sub GOP media segment storing metadata corresponding to the media data as the packet storage data.

(4) The communication apparatus according to (1) or (2), wherein the data processing unit generates NAL unit fragments obtained by further dividing a NAL unit configuring the GOP to generate a plurality of packets storing the NAL unit fragment and a packet storing metadata corresponding to the NAL unit.

(5) The communication apparatus according to any one of (1) to (4), wherein the data processing unit generates a packet storing divisional data generated by dividing encoded data serving as a transmission target into data equal to or less than a maximum data transfer unit (a maximum transfer unit (MTU)) specified on a communication path.

(6) The communication apparatus according to any one of (1) to (5), wherein the data processing unit generates a HTTP packet and records the additional information in a HTTP header of the generated packet.

(7) The communication apparatus according to any one of (1) to (5), wherein the data processing unit records the additional information in an extension header of the generated packet.

(8) The communication apparatus according to any one of (1) to (5), wherein the data processing unit records the additional information in an LCT header of the generated packet.

(9) The communication apparatus according to any one of (1) to (8), wherein the communication unit performs broadcast delivery or multicast delivery of the packet generated by the data processing unit through a broadcast wave.

(10) A communication apparatus, including:
a communication unit that receives encoded data storage packets transmitted by a transmission apparatus; and
a data processing unit that receives the packets received by the communication unit, and performs a process,
wherein each of the encoded data storage packets received by the communication unit is a packet storing NAL units configuring a group of pictures (GOP) serving as a processing unit of encoded data or NAL unit fragments obtained by further dividing the NAL unit and a packet to which access point information indicating whether the NAL unit stored in the packet or a NAL unit serving as a division source of the NAL unit fragments includes data serving as a random access point is set as additional information.

(11) The communication apparatus according to (10), wherein the data processing unit performs a process of determining whether data stored in the received packets is data generated based on a NAL unit including encoded data designated by streaming access point (SAP) with reference to the access point information serving as the additional information recorded in the received packets.

(12) The communication apparatus according to (10) or (11), wherein the data processing unit selects and acquires data including an access point with reference to the access point information serving as the additional information recorded in the received packets and performs decoding and reproduction processes.

(13) The communication apparatus according to any one of (10) to (12), wherein the communication unit receives a HTTP packet including a HTTP header in which the additional information is recorded, and the data processing unit acquires the additional information from the HTTP header of the received packet.

(14) The communication apparatus according to any one of (10) to (12), wherein the communication unit receives a packet including an extension header in which the additional information is recorded, and the data processing unit acquires the additional information from the extension header of the received packet.

(15) The communication apparatus according to any one of (10) to (12), wherein the communication unit receives a packet including an LCT header in which the additional information is recorded, and the data processing unit acquires the additional information from the LCT header of the received packet.

(16) The communication apparatus according to any one of (10) to (15), wherein the communication unit receives the packets through a broadcast wave.

(17) A communication data generation method performed in a data transmission apparatus, including:

generating, by a data processing unit, a packet storing NAL units configuring a group of pictures (GOP) serving as a processing unit of encoded data or NAL unit fragments obtained by further dividing the NAL unit;

generating, by the data processing unit, a packet to which access point information indicating whether the NAL unit stored in the packet or a NAL unit serving as a division source of the NAL unit fragments includes data serving as a random access point is set as additional information for the packet, and transmitting the generated packet through a communication unit.

(18) A communication data processing method performed in a data reception apparatus, including:

a step of receiving, by a communication unit, encoded data storage packets transmitted by a transmission apparatus; and a data processing step of receiving, by a data processing unit, the packets received by the communication unit and performing a process, wherein each of the encoded data storage packets received by the communication unit is a packet storing NAL units configuring a group of pictures (GOP) serving as a processing unit of encoded data or NAL unit fragments obtained by further dividing the NAL unit and a packet to which access point information indicating whether the NAL unit stored in the packet or a NAL unit serving as a division source of the NAL unit fragments includes data serving as a random access point is set as additional information, and the data processing step includes a step of receiving a packet to which the access point information received by the communication unit is set and performing a process.

The series of processes described in this specification may be executed by hardware, software, or a combined configuration thereof. When the processes are executed by software, a program recording a process sequence may be installed in a memory of a computer incorporated into dedicated hardware and executed, a program may be installed in a general-purpose computer capable of executing various kinds of processes and executed. For example, a program may be recorded in a recording medium in advance. A program can be installed in a computer from a recording medium, but a program may be received via a network such as a local area network (LAN) or the Internet and installed in a recording medium such as an internal hard disk.

Further, various kinds of processes described in this specification may be chronologically performed in the described order or may be performed in parallel or individually according to a processing capability of an apparatus that performs the process or as necessary. In this specification, a system refers to a logical aggregate configuration of a plurality of apparatuses and is not limited to a configuration in which apparatuses of respective configurations are arranged in the same housing.

As described above, according to the configuration of an embodiment of the present disclosure, a configuration in which it can be determined on a packet-by-packet basis whether encoded data stored in communication packets is data based on randomly accessible encoded data is implemented.

Specifically, a transmission apparatus generates a packet storing a NAL unit which is a component of encoded data or a packet storing NAL unit fragments obtained by further dividing the NAL unit, sets access point information indicating whether the NAL unit serving as the source data of packet storage data includes data serving as a random access point as additional information, and transmits the packet. A reception apparatus determines whether packet storage data is data generated based on randomly accessible encoded data with reference to the additional information of the packet.

With this configuration, a configuration in which it can be determined on a packet-by-packet basis whether encoded data stored in communication packets is data based on randomly accessible encoded data is implemented.

REFERENCE SIGNS LIST

10 Communication system
20 Transmission apparatus
21 Data processing unit
22 Communication unit
30 Reception apparatus
31 Data processing unit
32 Communication unit
50 Initialization segment
60 Media segment
201 CPU
202 ROM
203 RAM
204 Bus
205 Input/output interface
206 Input unit
207 Output unit
208 Storage unit
209 Communication unit
210 Drive
211 Removable medium

The invention claimed is:

1. A communication apparatus, comprising:
  circuitry configured to:
    generate packets storing encoded data; and
    transmit the packets generated,
  wherein one of the packets stores one data unit, a header of the one of the packets includes access point information indicating whether the one data unit stored in the one of the packets includes data serving as a random access point, the one of the packets is transmitted, and the data serving as the random access point includes a first byte of a first picture of an image sequence in which all states necessary for decoding a stream can be reset, wherein the one data unit is a fragment of a network abstract layer (NAL) unit.

2. The communication apparatus according to claim 1, wherein the one data unit is data generated based on the NAL unit that includes encoded data designated by a streaming access point (SAP).

3. The communication apparatus according to claim 1, wherein the circuitry generates media data including one or more data units serving as configuration data of a group of picture (GOP) corresponding to data units in a packet.

4. The communication apparatus according to claim 1, wherein the circuitry generates a different packet storing data units and the different packet does not include access point information.

5. The communication apparatus according to claim 1, wherein the circuitry generates a packet storing divisional data generated by dividing encoded data serving as a transmission target into data equal to or less than a maximum data transfer unit specified on a communication path.

6. The communication apparatus according to claim 1, wherein the header is an extension header.

7. The communication apparatus according to claim 1, wherein the header is a layered coding transport (LCT) header.

8. The communication apparatus according to claim 1, wherein the circuitry performs broadcast delivery or multicast delivery of the one of the packets through a broadcast wave.

9. A communication apparatus, comprising:
circuitry configured to:
  receive packets storing encoded data transmitted by a transmission apparatus; and
  process the packets received,
wherein one of the packets stores one data unit, a header of the one of the packets includes access point information indicating whether the one data unit stored in the one of the packets includes data serving as a random access point, and the data serving as the random access point includes a first byte of a first picture of an image sequence in which all states necessary for decoding a stream can be reset, wherein the one data unit is a fragment of a network abstract layer (NAL) unit.

10. The communication apparatus according to claim 9, wherein the circuitry performs a process of determining whether the one data unit is data generated based on the NAL unit including encoded data designated by streaming access point (SAP) with reference to the access point information serving as the access point information included in the header.

11. The communication apparatus according to claim 9, wherein the circuitry selects and acquires data including an access point with reference to the access point information serving as the access point information included in the header and performs decoding and reproduction processes.

12. The communication apparatus according to claim 9, wherein the circuitry acquires the access point information from the header.

13. The communication apparatus according to claim 9, wherein the circuitry acquires the access point information from the header that is an extension header.

14. The communication apparatus according to claim 9, wherein the circuitry acquires the access point information from the header that is a layered coding transport (LTCT) header.

15. The communication apparatus according to claim 9, wherein the circuitry receives the packets through a broadcast wave.

16. A communication data generation method performed in a data transmission apparatus, comprising:
  generating, by circuitry, packets storing encoded data, wherein one of the packets stores one data unit, a header of the one of the packets includes access point information indicating whether the one data unit stored in the one of the packets includes data serving as a random access point, and the data serving as the random access point includes a first byte of a first picture of an image sequence in which all states necessary for decoding a stream can be reset, wherein the one data unit is a fragment of a network abstract layer (NAL) unit; and
  transmitting the one of the packets.

17. A communication data processing method performed in a data reception apparatus, comprising:
  receiving, by communication circuitry, encoded data storage packets; and
  receiving, by data processing circuitry, the encoded data storage packets received by the communication circuitry,
wherein one of the encoded data storage packets received by the communication circuitry is configured to store one data unit, a header of the one of the encoded data storage packets includes access point information indicating whether the one data unit stored in the one of the encoded data storage packets includes data serving as a random access point, and
the data serving as the random access point includes a first byte of a first picture of an image sequence in which all states necessary for decoding a stream can be reset, wherein the one data unit is a fragment of a network abstract layer (NAL) unit.

* * * * *